United States Patent
Yabuuchi et al.

(10) Patent No.: US 8,570,617 B2
(45) Date of Patent: Oct. 29, 2013

(54) IMAGE READING APPARATUS FOR READING ADJUSTMENT DOCUMENT USED FOR IMAGE ADJUSTMENT, IMAGE FORMING APPARATUS WITH IMAGE READING APPARATUS AND ADJUSTMENT DOCUMENT USED IN IMAGE READING APPARATUS

(75) Inventors: Yasuyuki Yabuuchi, Osaka (JP); Atsushi Fujiki, Osaka (JP); Masaki Baba, Osaka (JP)

(73) Assignee: Kyocera Mita Corporation (JP)

( * ) Notice: Subject to any disclaimer, the term of this patent is extended or adjusted under 35 U.S.C. 154(b) by 255 days.

(21) Appl. No.: 13/285,295

(22) Filed: Oct. 31, 2011

(65) Prior Publication Data

US 2012/0133996 A1 May 31, 2012

(30) Foreign Application Priority Data

Nov. 30, 2010  (JP) ................................ 2010-266806
Nov. 30, 2010  (JP) ................................ 2010-266807
Nov. 30, 2010  (JP) ................................ 2010-266808

(51) Int. Cl.
| | |
|---|---|
| H04N 1/04 | (2006.01) |
| H04N 1/23 | (2006.01) |
| H04N 1/46 | (2006.01) |
| G06K 15/00 | (2006.01) |
| G06K 9/36 | (2006.01) |
| G09G 5/00 | (2006.01) |
| G03G 15/00 | (2006.01) |

(52) U.S. Cl.
USPC .......... 358/474; 358/534; 358/530; 358/1.16; 358/304; 358/296; 345/634; 399/15; 382/284

(58) Field of Classification Search
USPC ................ 358/474, 534, 530, 1.16, 304, 296; 345/634; 399/15; 382/284
See application file for complete search history.

(56) References Cited

U.S. PATENT DOCUMENTS

| | | | |
|---|---|---|---|
| 2007/0177218 A1* | 8/2007 | Sugawara et al. | 358/296 |
| 2007/0177219 A1* | 8/2007 | Shinozaki et al. | 358/304 |
| 2007/0211288 A1* | 9/2007 | Uejo et al. | 358/1.16 |
| 2008/0062484 A1* | 3/2008 | Moriya et al. | 358/534 |
| 2009/0208228 A1* | 8/2009 | Asasaka et al. | 399/15 |
| 2010/0079492 A1* | 4/2010 | Nakamura | 345/634 |

FOREIGN PATENT DOCUMENTS

| | | |
|---|---|---|
| JP | 7-273954 | 10/1995 |
| JP | 2010-200284 | 9/2010 |

* cited by examiner

*Primary Examiner* — Charlotte M Baker
*Assistant Examiner* — Rury Grisham
(74) *Attorney, Agent, or Firm* — Gerald E. Hespos; Michael J. Porco; Matthew T. Hespos

(57) ABSTRACT

An image reading apparatus includes an image reader, an image adjuster and an execution controller that causes the image reader to read an adjustment document and causes the image adjuster to adjust image data generated by the image reader. The adjustment document includes line images and parameter images at positions spaced apart in a main scanning direction in a margin area where the line images are not provided. The parameter images indicate parameters used in image adjustment processing. The execution controller judges whether the image data corresponding to predetermined positions in the main scanning direction coincide, selects one of the image data judged to coincide, and causes the image adjuster to perform the image adjustment using the selected image data and the parameter indicated by the image data generated by reading the parameter image at the position in the main scanning direction of the selected image data.

13 Claims, 10 Drawing Sheets

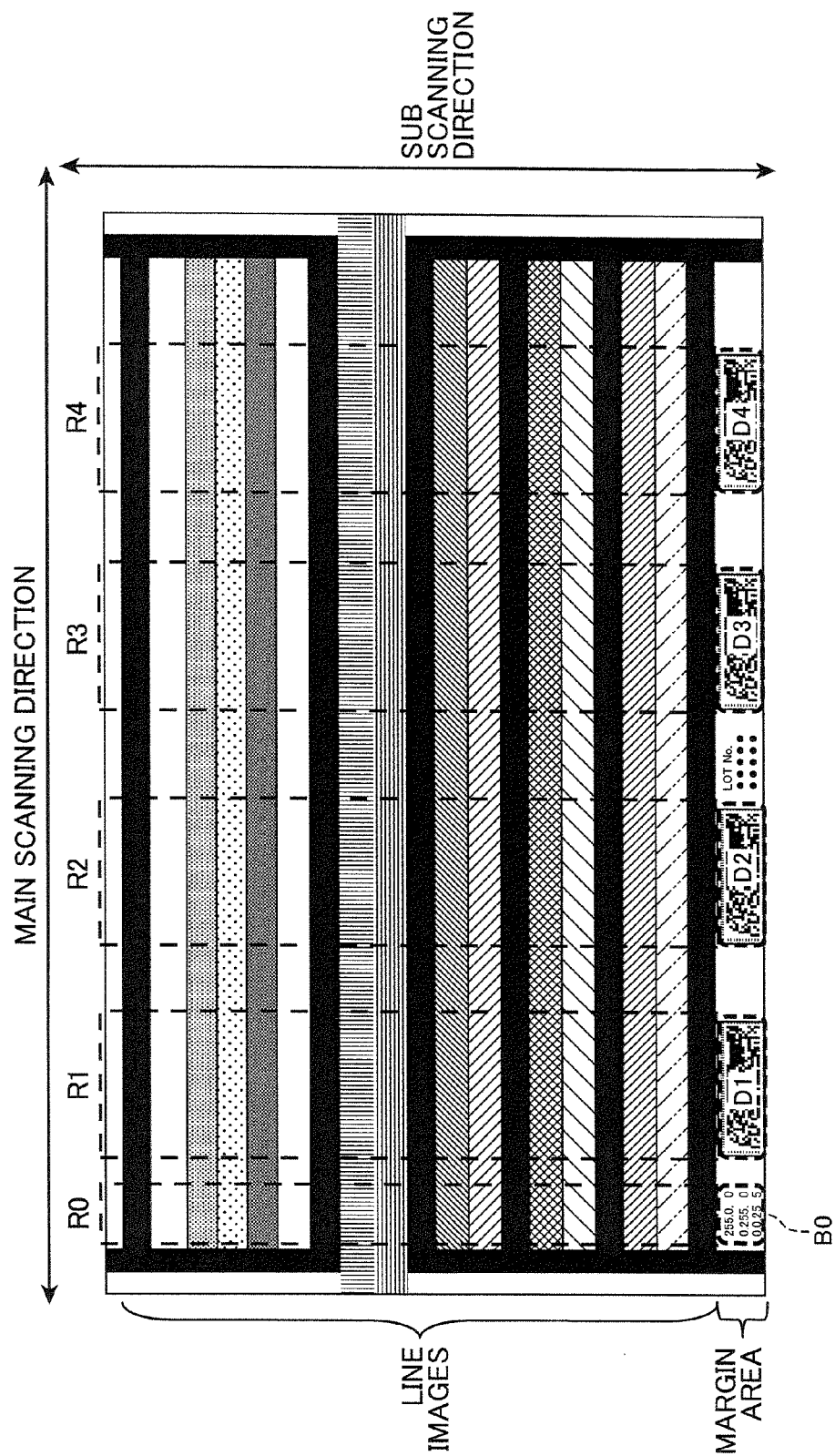

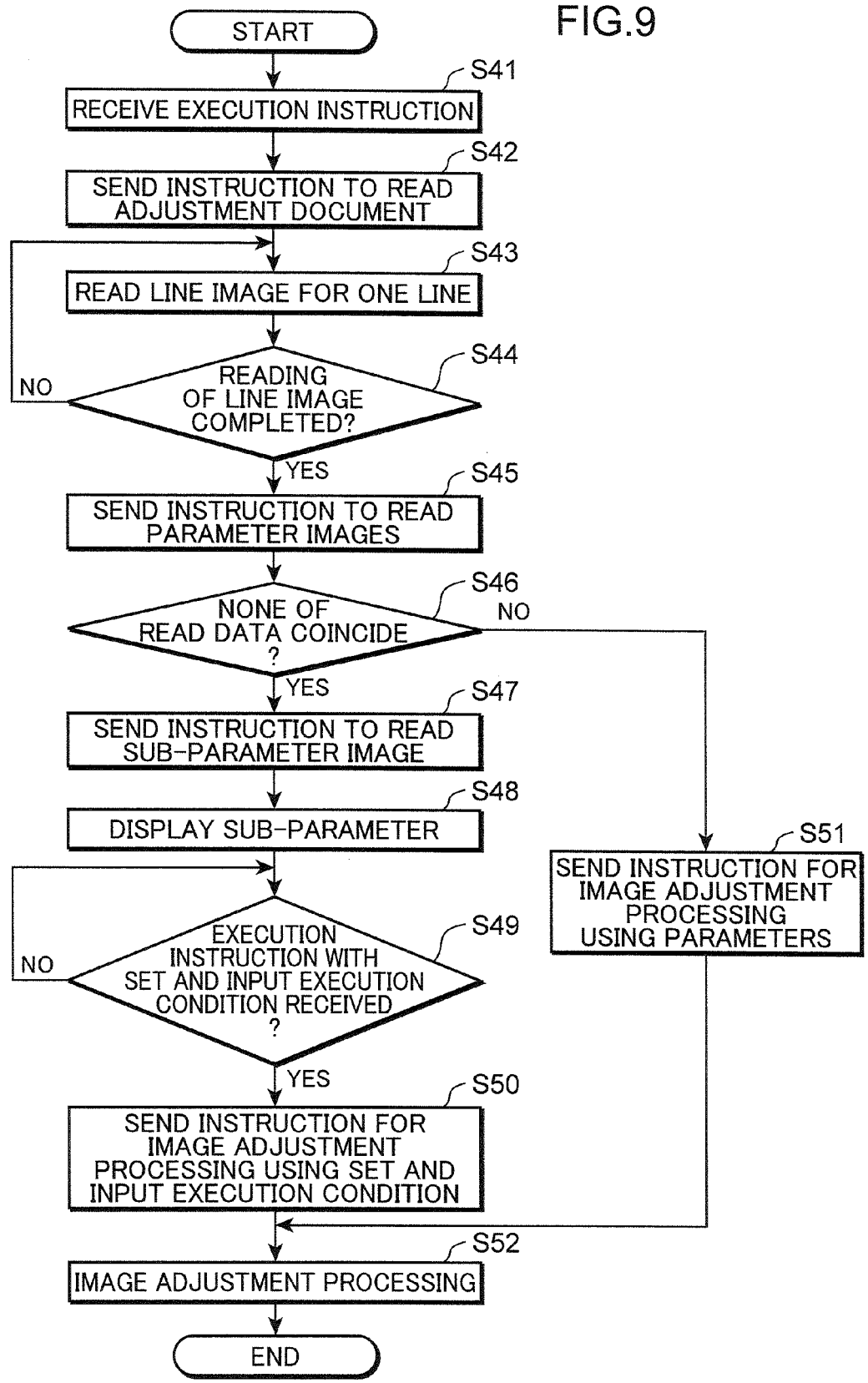

FIG.10A

| LINE | REFERENCE VALUE |
|---|---|
| RED1 | 255.0.0 |
| ... | – |
| GREEN1 | 0.255.0 |
| ... | – |
| BLUE1 | 0.0.255 |
| ... | – |
| ... | – |

AL

| LINE | SET VALUE |
|---|---|
| RED1 | ... |
| ... | ... |
| GREEN1 | ... |
| ... | ... |
| BLUE1 | ... |
| ... | ... |
| ... | ... |

| LINE | REFERENCE VALUE |
|---|---|
| RED1 | 255.0.0 |
| ... | – |
| GREEN1 | 0.255.0 |
| ... | – |
| BLUE1 | 0.0.255 |
| ... | – |
| ... | – |

AL

| LINE | SET VALUE |
|---|---|
| RED1 | 255.0.0 |
| ... | |
| GREEN1 | 0.255.0 |
| ... | |
| BLUE1 | 0.0.255 |
| ... | |

AR

51

IMAGE READING APPARATUS FOR READING ADJUSTMENT DOCUMENT USED FOR IMAGE ADJUSTMENT, IMAGE FORMING APPARATUS WITH IMAGE READING APPARATUS AND ADJUSTMENT DOCUMENT USED IN IMAGE READING APPARATUS

BACKGROUND OF THE INVENTION

1. Field of the Invention

The present invention relates to a technology in reading an adjustment document used for image adjustment by an image reading apparatus.

2. Description of the Related Art

Conventionally, an image forming apparatus has been used which processes document image data generated by reading a document by an image reading apparatus such as a scanner. For example, a scanner itself, or a copier, a facsimile machine, a complex machine of these or the like that processes image data of a document read by the scanner is used as such.

Here, document image data does not necessarily indicate an original image on a document due to a reading characteristic of an image reading apparatus. Thus, image adjustments such as an input γ adjustment for adjusting image density to reproduce specified image density and an MTF (Modulation Transfer Function)/matrix adjustment for adjusting densities of respective YMCK colors to reproduce specified colors are performed, for example, regularly such as after a specified number of documents are read or after the elapse of a specified time or when significant abnormality is found in image data to be output.

For example, according to a certain image adjustment technology, a white reference plate with a bar-code indicating a chromaticity value measured beforehand is bonded to a document table glass, and the light quantity of a light source and the level of an output signal when a document is read are adjusted so that an output signal obtained by reading the white reference plate has a chromaticity value substantially equal to that indicated by the bar-code.

According to another image adjustment technology, a reference chart including a plurality of gradation patches and bar-codes recorded with density reference values corresponding to the respective patches is read, correction ratios corresponding to the plurality of respective gradation patches are calculated from density values of the read gradation patches and the density reference values indicated by the bar-code, and a reading characteristic is corrected using a gradation table generated using the calculated correction ratios.

However, conventionally, there has been a possibility of a failure in reading the bar-codes due to the smear of a document table or the smear of the white reference plate or the reference chart in the case of reading the white reference plate or the reference chart. Thus, parameters used in an image adjustment processing such as the chromaticity values and the density reference values indicated by the bar-codes could not be obtained and the image adjustment processing could not be appropriately performed in some cases.

SUMMARY OF THE INVENTION

Accordingly, in view of such a situation, an object of the present invention is to provide an image reading apparatus which enables an image adjustment processing to be appropriately performed using an image adjustment document, an image forming apparatus and an adjustment document.

One aspect of the present invention is directed to an image reading apparatus, includes: an image reader that performs an image reading processing of reading a document and generating image data while moving relative to the document in a sub scanning direction; an image adjuster that performs an image adjustment processing using image data generated by reading an adjustment document, which is a document for image adjustment, by the image reading processing performed by the image reader; an instruction receiver that receives an instruction to perform the image adjustment processing; and an execution controller that causes the image reader to perform the image reading processing of reading the adjustment document and generating the image data, and causes the image adjuster to perform the image adjustment processing using the image data generated by the image reading processing when the instruction to perform the image adjustment processing is received by the instruction receiver, wherein the adjustment document includes line images each indicating the same chromaticness in a main scanning direction and arranged in parallel in the sub scanning direction and parameter images provided at a plurality of predetermined positions respectively spaced apart in the main scanning direction in a margin area where the line images are not provided, wherein the parameter images indicate parameters used in a case of performing the image adjustment processing using image data corresponding to positions in the main scanning direction respectively indicated by the plurality of predetermined positions out of image data generated by reading the line images by the image reading processing, and wherein the execution controller causes the image reader to perform the image reading processing of reading the adjustment document, judges whether or not the respective image data generated by reading the line images and corresponding to the plurality of predetermined positions in the main scanning direction coincide with each other, selects any one of the image data judged to coincide out of the respective image data, and causes the image adjuster to perform the image adjustment processing using the selected image data and the parameter indicated by the image data generated by reading the parameter image provided at the position in the main scanning direction of the selected image data.

Another aspect of the present invention is directed to an image forming apparatus, includes: the above image reading apparatus; and a recording unit that forms an image indicated by image data on a recording medium using the image data generated by reading a document, an image of which is to be formed, by the image reader.

Still another aspect of the present invention is directed to an adjustment document which is a document for image adjustment used in an image adjustment processing in an image reading apparatus, includes: line images each indicating the same chromaticness in a main scanning direction and arranged in parallel in a sub scanning direction; and parameter images provided at a plurality of predetermined positions respectively spaced apart in the main scanning direction in a margin area where the line images are not provided, wherein the image reading apparatus includes: an image reader that performs an image reading processing of reading a document and generating image data while moving relative to the document in the sub scanning direction; an image adjuster that performs an image adjustment processing using image data generated by reading the adjustment document by the image reading processing performed by the image reader; an instruction receiver that receives an instruction to perform the image adjustment processing; and an execution controller that causes the image reader to perform the image reading processing of reading the adjustment document, and causes the image adjuster to perform the image adjustment processing using the image data generated by the image reading processing when the instruction to perform the image adjustment processing is received by the instruction receiver, wherein the parameter images indicate parameters used in a case of performing the image adjustment processing using image data corresponding to positions in the main scanning direction respectively indicated by the plurality of predetermined positions out of image data generated by reading the line images by the image reading processing, and wherein the execution controller causes the image reader to perform the image reading processing of reading the adjustment document, judges whether or not the respective image data generated by reading the line images and corresponding to the plurality of predetermined positions in the main scanning direction coincide with each other, selects any one of the image data judged to coincide out of the respective image data, and causes the image adjuster to perform the image adjustment processing using the selected image data and the parameter indicated by the image data generated by reading the parameter image provided at the position in the main scanning direction of the selected image data.

Another aspect of the present invention is directed to an image reading apparatus, includes: an image reader that performs an image reading processing of reading a document and generating image data while moving relative to the document in a sub scanning direction; an image adjuster that performs an image adjustment processing using image data generated by reading an adjustment document, which is a document for image adjustment, by the image reading processing performed by the image reader; an instruction receiver that receives an instruction to perform the image adjustment processing; and an execution controller that causes the image reader to perform the image reading processing of reading the adjustment document and generating the image data, and causes the image adjuster to perform the image adjustment processing using the image data generated by the image reading processing when the instruction to perform the image adjustment processing is received by the instruction receiver, wherein the adjustment document includes line images each indicating the same chromaticness in a main scanning direction and arranged in parallel in the sub scanning direction, parameter images provided at a plurality of predetermined positions respectively spaced apart in the main scanning direction in a margin area where the line images are not provided, and a sub-parameter image provided at a predetermined position in a part of the margin area where the parameter images are not provided and which is not sufficient to provide the parameter image, wherein the parameter images indicate parameters used in a case of performing the image adjustment processing using image data generated by reading the line images by the image reading processing, wherein the sub-parameter image indicates a sub-parameter used to perform at least a part of the image adjustment processing using the parameters, and wherein the execution controller causes the image reader to perform the image reading processing of reading the adjustment document and generating the image data, judges whether or not all the image data generated by reading the parameter images coincide with each other, and causes, when judging that none of the image data coincide with each other, the image adjuster to perform at least the part of the image adjustment processing using the parameters, using the sub-parameter indicated by the image data generated by reading the sub-parameter image.

Still another aspect of the present invention is directed to an image forming apparatus, includes: the above image reading apparatus; and a recording unit that forms an image indicated by image data on a recording medium using the image data generated by reading a document, an image of which is to be formed, by the image reader.

Another aspect of the present invention is directed to an image reading apparatus, includes: an operation unit that includes a display unit on which a setting screen used to set and input execution conditions of various functional operations executable in the image reading apparatus is displayed, and is adapted to set and input the execution condition on the setting screen displayed on the display unit; an image reader that performs an image reading processing of reading a document and generating image data while moving relative to the document in a sub scanning direction; an image adjuster that performs an image adjustment processing using image data generated by reading an adjustment document, which is a document for image adjustment, by the image reading processing performed by the image reader; an instruction receiver that receives an instruction to perform the image adjustment processing using the execution condition set and input by the operation unit; and an execution controller that causes the image reader to perform the image reading processing of reading the adjustment document and generating the image data, and causes the image adjuster to perform the image adjustment processing using the image data generated by the image reading processing and the execution condition of the image adjustment processing set and input by the operation unit when the instruction to perform the image adjustment processing is received by the instruction receiver, wherein the adjustment document includes line images each indicating the same chromaticness in a main scanning direction and arranged in parallel in the sub scanning direction, parameter images provided at a plurality of predetermined positions respectively spaced apart in the main scanning direction in a margin area where the line images are not provided, and a sub-parameter image provided at a predetermined position in a part of the margin area where the parameter images are not provided and which is not sufficient to provide the parameter image, wherein the parameter images indicate parameters used in a case of performing the image adjustment processing using image data generated by reading the line images by the image reading processing, wherein the sub-parameter image indicates a sub-parameter used to perform at least a part of the image adjustment processing using the parameters and coinciding with at least some of elements indicated by the parameters, wherein the execution controller causes the image reader to perform the image reading processing of reading the adjustment document and generating the image data, judges whether or not all the image data generated by reading the parameter images coincide with each other, and causes, when judging that none of the image data coincide with each other, the sub-parameter indicated by image data generated by reading the sub-parameter image to be displayed within the setting screen displayed on the display unit and used to set and input the execution condition of the image adjustment processing, and wherein the execution controller causes the image adjuster to perform the image adjustment processing using an execution condition corresponding to the set and input parameter when the execution condition of the image adjustment processing corresponding to the parameter is set and input on the displayed setting screen by the operation unit and an instruction to perform the image adjustment processing using the set and input execution condition is received by the instruction receiver.

Still another aspect of the present invention is directed to an image forming apparatus, includes: the above image reading apparatus; and a recording unit that forms an image indicated by image data on a recording medium using the image data generated by reading a document, an image of which is to be formed, by the image reader.

These and other objects, features and advantages of the present invention will become more apparent upon reading the following detailed description along with the accompanying drawings.

BRIEF DESCRIPTION OF THE DRAWINGS

FIG. 8 is a diagram showing an example of an adjustment document used in a third embodiment of an image forming apparatus according to the invention, FIG. 9 is a flow chart showing an example of operations when an image adjustment processing is performed in the third embodiment, FIGS. 10A and 10B are diagrams showing examples of setting screens used to set and input an execution condition of the image adjustment processing in the third embodiment.

DETAILED DESCRIPTION OF THE PREFERRED EMBODIMENTS

Hereinafter, an image reading apparatus and an image forming apparatus according to the present invention are described with reference to the drawings. Note that, in the following respective embodiments, the image reading apparatus and the image forming apparatus according to the present invention are described taking a complex machine provided with color copier, scanner, facsimile and printer functions and other functions as an example.

(First Embodiment)

Figure 1:
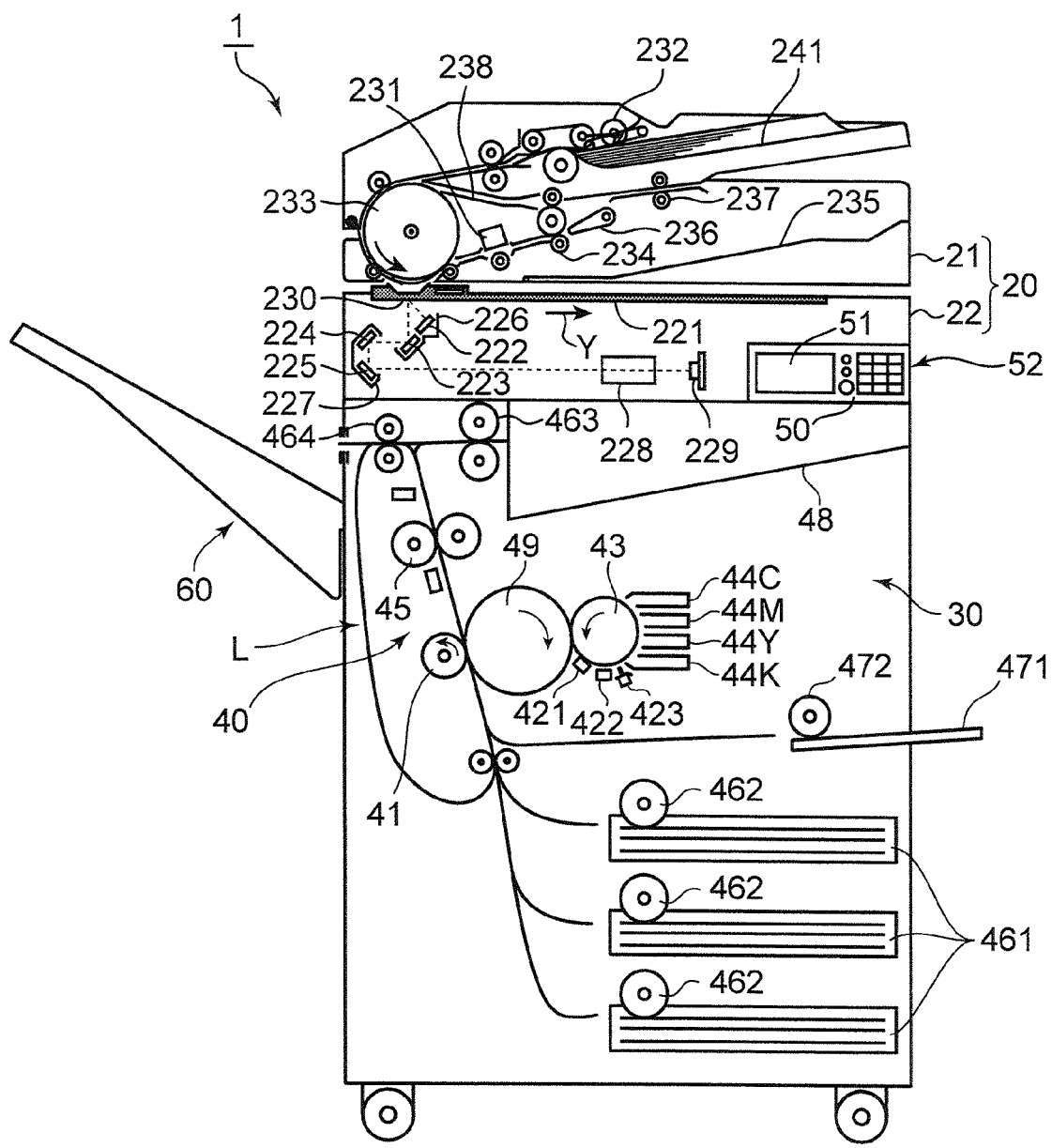
FIG. 1 is a schematic construction diagram of a complex machine according to a first embodiment of an image forming apparatus according to the invention.

As shown in FIG. 1, a complex machine 1 includes an image reading apparatus 20 and an apparatus main body 30. The image reading apparatus 20 includes a document feeder 21, an image reader 22 and an image processor 23 (FIG. 2).

The document feeder 21 realizes an ADF (Automatic Document Feeder) and includes a document placing table 241, a feed roller 232, a feeder drum 233, discharge rollers 234 and a discharge tray 235.

The document placing table 241 is where documents are to be placed, and the documents placed on the document placing table 241 are fed one by one by the feed roller 232 and conveyed to the feeder drum 233. The documents having passed around the feeder drum 233 are discharged to the discharge tray 235 by the discharge rollers 234.

Figure 2:
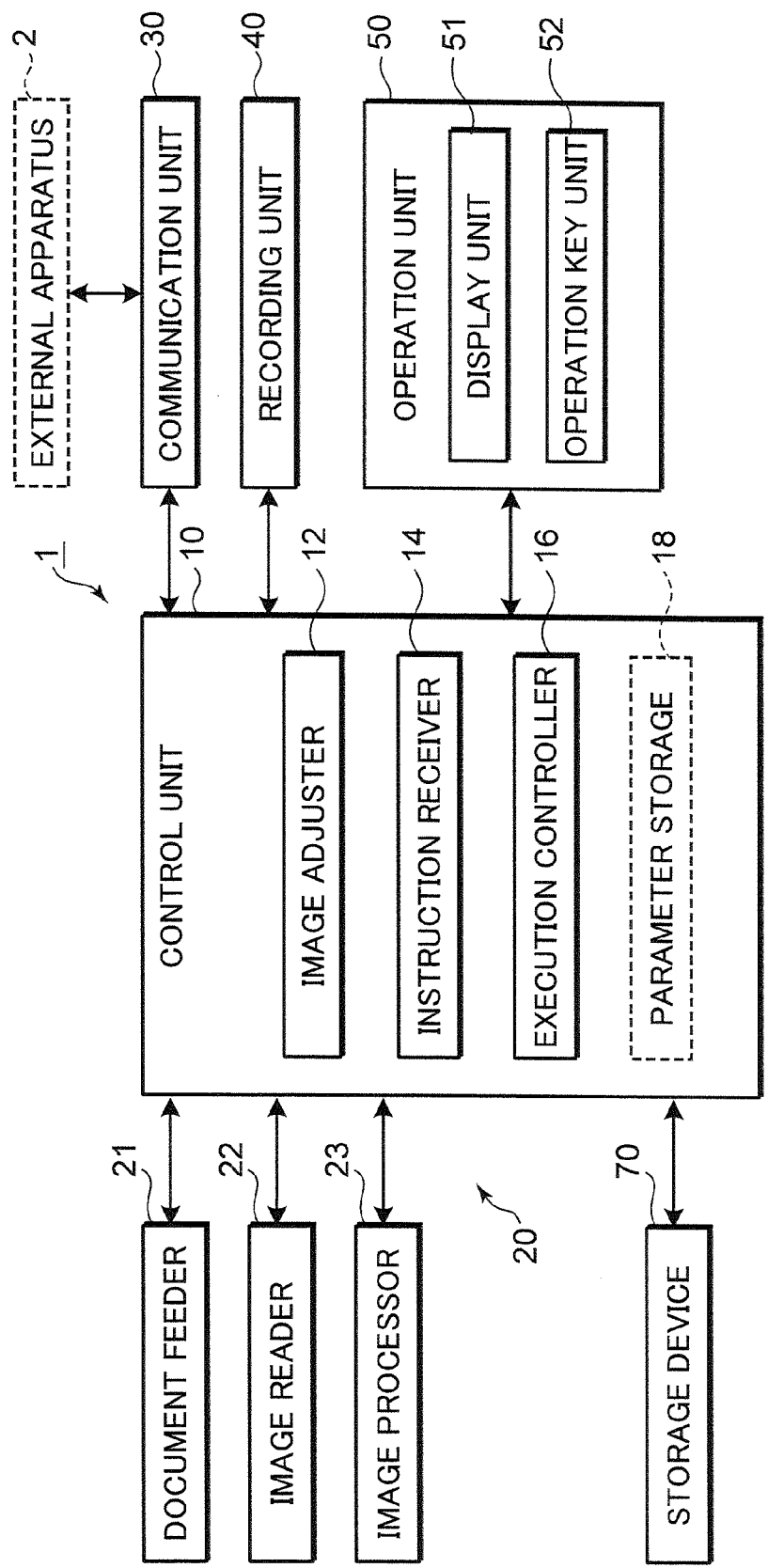
FIG. 2 is a block diagram showing the electrical construction of the complex machine shown in FIG. 1.

The image reader 22 optically reads an image of a document, generates image data and outputs it to the image processor 23 (FIG. 2). The image reader 22 is provided in the apparatus main body 3. The image reader 22 includes a contact glass 221 as an example of a document table, a light source 222, a first mirror 223, a second mirror 224, a third mirror 225, a first carriage 226, a second carriage 227, an imaging lens 228, a CCD (Charge Coupled Device) 229 and a carriage mover (not shown). Note that the light source 222 and the first mirror 223 are supported by the first carriage 226, and the second mirror 224 and the third mirror 225 are supported by the second carriage 227.

A white fluorescent lamp, a white LED, or the like is used as the light source 222. The first mirror 223, the second mirror 224, the third mirror 225, the first carriage 226, the second carriage 227 and the imaging lens 228 are for introducing light reflected from a document to the CCD 229 when light is irradiated to the document from the light source 222.

A CIS (Contact Image Sensor) 231 is provided downstream of the image reader 22 in a document conveying direction. In a document conveyance path, the CIS 231 is provided at a position where it can read a surface of the document opposite to the one read by the image reader 22.

As a document reading method of the image reading apparatus 20, there are a flat bed reading mode in which a document placed on the contact glass 221 is read by the image reader 22 and an ADF reading mode for feeding a document by the ADF and reading it during the conveyance thereof.

In the flat bed reading mode, the light source 222 irradiates a document placed on the contact glass 221 with light, and reflected light of one line in a main scanning direction is successively reflected by the first mirror 223, the second mirror 224 and the third mirror 225 to be incident on the imaging lens 228. The light incident on the imaging lens 228 is imaged on a light receiving surface of the CCD 229.

Note that the CCD 229 is a linear image sensor and outputs image data of one line of the document in the main scanning direction by photoelectrically converting the received reflected light upon receiving the reflected light of one line in the main scanning direction of the document.

When reading of one line of the document in the main scanning direction is completed in this way, the first carriage 226 and the second carriage 227 are moved by the carriage mover in a direction (sub scanning direction, direction of an arrow Y) perpendicular to the main scanning direction for reading of the next line.

In the ADF reading mode, documents placed on the document placing table 241 are fed one by one by the feed roller 232, the light source 222 irradiates the document with light when the document passes above a reading position 230 in a conveyance path from the feeder drum 233 to the discharge tray 235, and reflected light of one line in the main scanning direction is successively reflected by the first mirror 223, the second mirror 224 and the third mirror 225 to be incident on the imaging lens 228. The light incident on the imaging lens 228 is imaged on the light receiving surface of the CCD 229. Subsequently, the document is conveyed in the sub scanning direction by the document feeder 21 for reading of the next line.

In this way, the image reader 22 performs an image reading processing of reading a document and generating image data in the flat bed reading mode or the ADF reading mode while moving relative to the document in the sub scanning direction. Note that, in the following description, it is premised to read a document in the flat bed reading mode unless otherwise described.

The image processor 23 (FIG. 2) performs a correction processing including a shading correction, a level correction, a gamma correction and the like and an image correction processing such as image data compression or expansion processing and image data enlargement or reduction on image data generated by reading a document in the image reader 22. The image data after this processing is used for image formation in a recording unit 40 to be described later.

The apparatus main body 30 includes a plurality of sheet cassettes 461, feed rollers 462 for feeding sheets (recording media) from the sheet cassettes 461 one by one and conveying them to the recording unit 40, the recording unit 40 for forming images on sheets conveyed from the sheet cassettes 461, and a stack tray 60 arranged on the left side.

The apparatus main body 30 further includes a manual feed tray 471. Arbitrary recording media such as sheets of a size stored in none of the sheet cassettes, sheets having an image already formed on one side thereof or OHP sheets can be placed on this manual feed tray 471 and are fed one by one into the apparatus main body 30 by a feed roller 472.

The recording unit 40 includes a charge remover 421 for removing residual charges from a surface of a photoconductive drum 43, a charger 422 for charging the surface of the photoconductive drum 43 after charge removal, an exposure device 423 for exposing the surface of the photoconductive drum 43 by outputting a laser beam based on image data generated by the image reader 22 and corrected by the image processor 23 and forming an electrostatic latent image on the surface of the photoconductive drum 43, developing devices 44C, 44M, 44Y and 44K for forming toner images of respective colors, i.e. cyan (C), magenta (M), yellow (Y) and black (K) on the photoconductive drum 43 based on the electrostatic latent image, a transfer drum 49 to which the toner images of the respective colors formed on the photoconductive drum 43 are transferred to be superimposed, a transfer device 41 for transferring a full color toner image on the transfer drum 49 to a sheet, and a fixing device 45 for fixing the toner image to the sheet by heating the sheet having the toner image transferred thereto.

Note that toners corresponding to the respective colors of cyan, magenta, yellow and black are supplied from unillustrated toner supply containers (toner cartridges). Further, conveyor rollers 463, 464 and the like are provided to convey the sheet having passed through the recording unit 40 to the stack tray 60 or a discharge tray 48.

An operation unit 50 is provided on the front side of the apparatus main body 30. The operation unit 50 includes a display unit 51 composed of an LCD (Liquid Crystal Display) and the like, and an operation key unit 52 used by an operator to input operation instructions.

The operation key unit 52 includes a numerical keypad, a start key, a function switch key, and the like. Note that the start key is a key for receiving instructions to start operations such as a copy operation and a scan operation from the operator. The numerical keypad includes keys for receiving execution conditions of various functional operations such as the number of copies to be made from the operator. The function switch key is a key for receiving a function switching instruction to switch a function among a scanner function, a facsimile function, a printer function, a copy function, an image adjustment function described later and the like from the operator.

The display unit 51 includes a touch panel unit composed of the LCD (Liquid Crystal Display) and the like and provided with a touch panel function. Various operation screens and setting screens used to set and input execution conditions of various functional operations executable in the complex machine 1 are displayed on the display unit 51.

Note that execution instructions of various functions are input and the execution conditions of various functional operations are set and input by the operator touching the operation screen or setting screen displayed on the display unit 51 (displayed operation keys) or operating the operation key unit 52.

Next, an example of the electrical construction of the complex machine 1 is described. As shown in FIG. 2, the complex machine 1 includes a communication unit 30 and a control unit 10 as well as the document feeder 21, the image reader 22, the recording unit 40, the operation unit 50 and the image processor 23 described above.

The communication unit 30 is for carrying out communication of various data with a specified external apparatus 2 (encircled by dotted line in FIG. 2) such as a personal computer.

The control unit 10 includes a RAM (Random Access Memory) having a function of temporarily storing data and a function as a work area, a flash memory storing a program beforehand, and a CPU for reading the program and the like from the flash memory and executing the program. The CPU, and the RAM and the flash memory are so configured as to transfer data via a data bus. The CPU performs processings corresponding to the content of the program by appropriately executing the program stored in the flash memory.

The control unit 10 functions as an image adjuster 12, an instruction receiver 14 and an execution controller 16.

The image adjuster 12 performs an image adjustment processing using image data generated by reading an adjustment document, which is a document for image adjustment, by an image reading processing. The image adjuster 12 performs the image adjustment processing including an input γ adjustment for adjusting image density to reproduce specified image density and an MTF (Modulation Transfer Function)/matrix adjustment for adjusting densities of respective YMCK colors to reproduce specified colors, for example, regularly such as after a specified number of documents are read or after the elapse of a specified time or when significant abnormality is found in image data to be output since image data generated by reading a document by the image reader 22 does not necessarily indicate an original image on the document due to a reading characteristic of the image reader 22.

Figure 3:
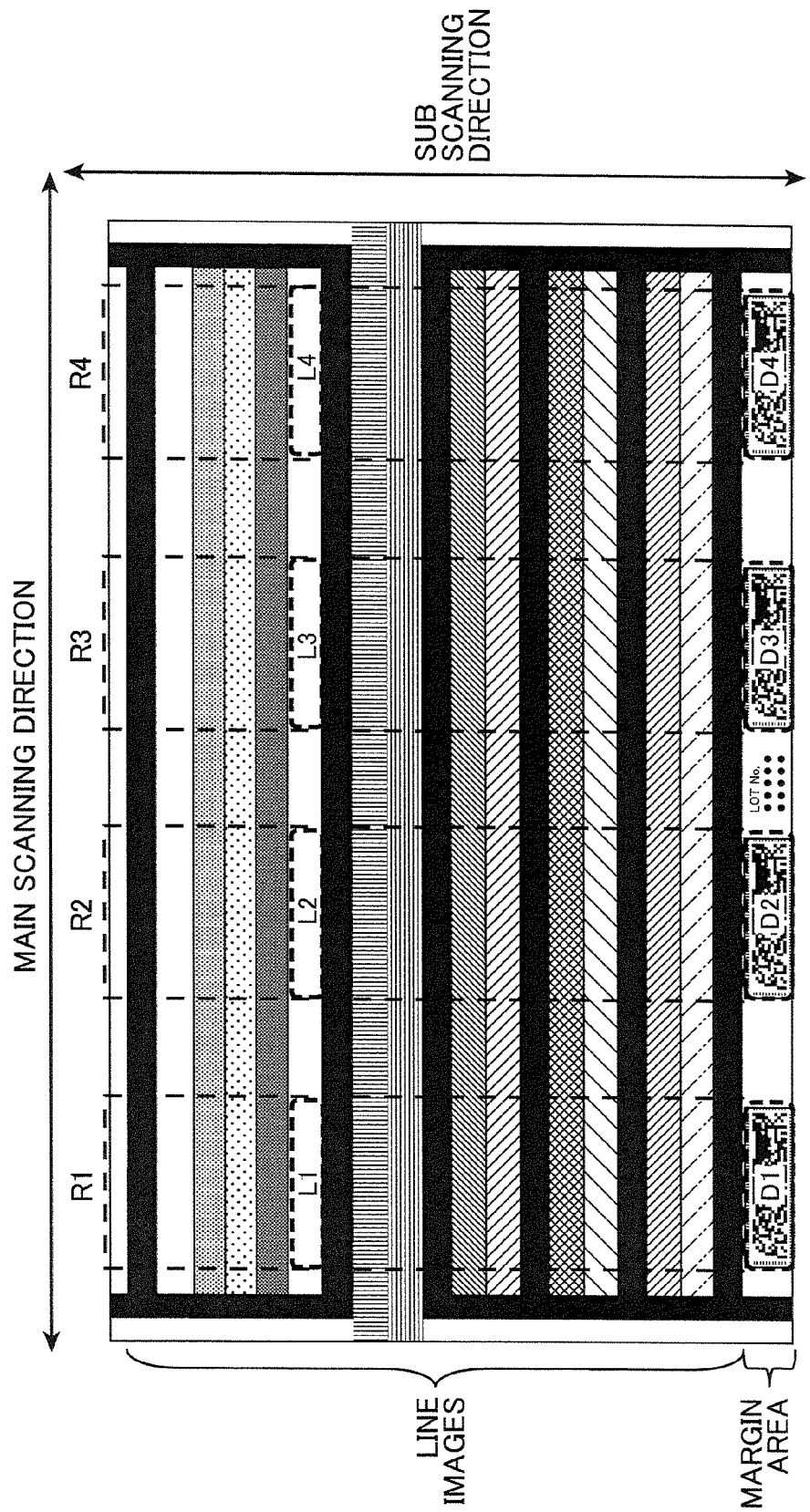
FIG. 3 is a diagram showing an example of an adjustment document used in the first embodiment.

For example, as shown in FIG. 3, line images each indicating the same chromaticness in the main scanning direction are arranged in parallel in the sub scanning direction on the adjustment document for image adjustment, and two-dimensional bar-codes D1 to D4 as parameter images according to the present invention are provided at a plurality of predetermined positions spaced apart in the main scanning direction in a margin area where no line images are provided.

Here, the two-dimensional bar-codes D1 to D4 are configured to indicate data corresponding to positions R1 to R4 in the main scanning direction where the respective two-dimensional bar-codes are provided out of image data generated by reading all the line images beforehand by a density meter or the like.

Note that, in the first embodiment, the configuration of the adjustment document is not limited to the one shown in FIG. 3. For example, the two-dimensional bar-codes D1 to D4 may be respectively provided at different positions in the sub scanning direction and no line images may be formed at the positions of the respective two-dimensional bar-codes D1 to D4 in the sub scanning direction.

In the first embodiment, the plurality of predetermined positions which are spaced apart in the main scanning direction and where the two-dimensional bar-codes D1 to D4 are provided are stored in the flash memory beforehand corresponding to identification information of the adjustment document. However, the adjustment document is not limited to this, and fixed values may be stored in the flash memory beforehand so that two-dimensional bar-codes are provided at the same positions common to different adjustment documents.

As an example of the image adjustment processing using the adjustment document shown in FIG. 3, the image adjuster 12 compares the data corresponding to the positions R1 to R4 in the main scanning direction out of the image data generated by reading the line images of this adjustment document by the image reader 22 and data corresponding to the positions R1 to R4 in the main scanning direction indicated by image data generated by reading the two-dimensional bar-codes D1 to D4 by the image reader 22, and calculates a correction value used in correcting the image data read and generated by the image reader 22 in the image processor 23 based on deviation amounts of these data.

That is, the data corresponding to the positions R1 to R4 in the main scanning direction indicated by the two-dimensional bar-codes D1 to D4 are used as data indicating target values (parameters) in the case of performing the image adjustment processing using the adjustment document.

Here, parameter images according to the present invention are not limited to the above two-dimensional bar-codes. How they are expressed on the adjustment document may be arbitrarily changed, for example, by being provided as one-dimensional bar-codes on the adjustment document or by providing the respective data as character strings on the adjustment document. It goes without saying that a mechanism corresponding to an expression mode of the parameter images is provided to obtain data indicated by the parameter images from data of the parameter images read by the image reader 22.

The instruction receiver 14 receives an instruction to perform the image adjustment processing by the image adjuster 12. For example, the instruction receiver 14 receives the input of an execution condition of the image adjustment processing, the input of the execution condition being made by a user depressing a function switch key provided in the operation key unit 52 and the like, the execution condition being the identification information of an adjustment document used in the image adjustment processing and the like.

When the instruction to perform the image adjustment processing is received by the instruction receiver 14, the execution controller 16 sends an instruction to the image reader 22 to perform an image reading processing of reading the adjustment document and generating image data, and then sends an instruction to the image adjuster 12 to perform an image adjustment processing using the image data read and generated by the image reading processing.

As described above, an example of the image reading apparatus 20 according to the present invention includes the image reader 22 and the control unit 10. Note that a parameter storage 18 is described later.

Figure 4:
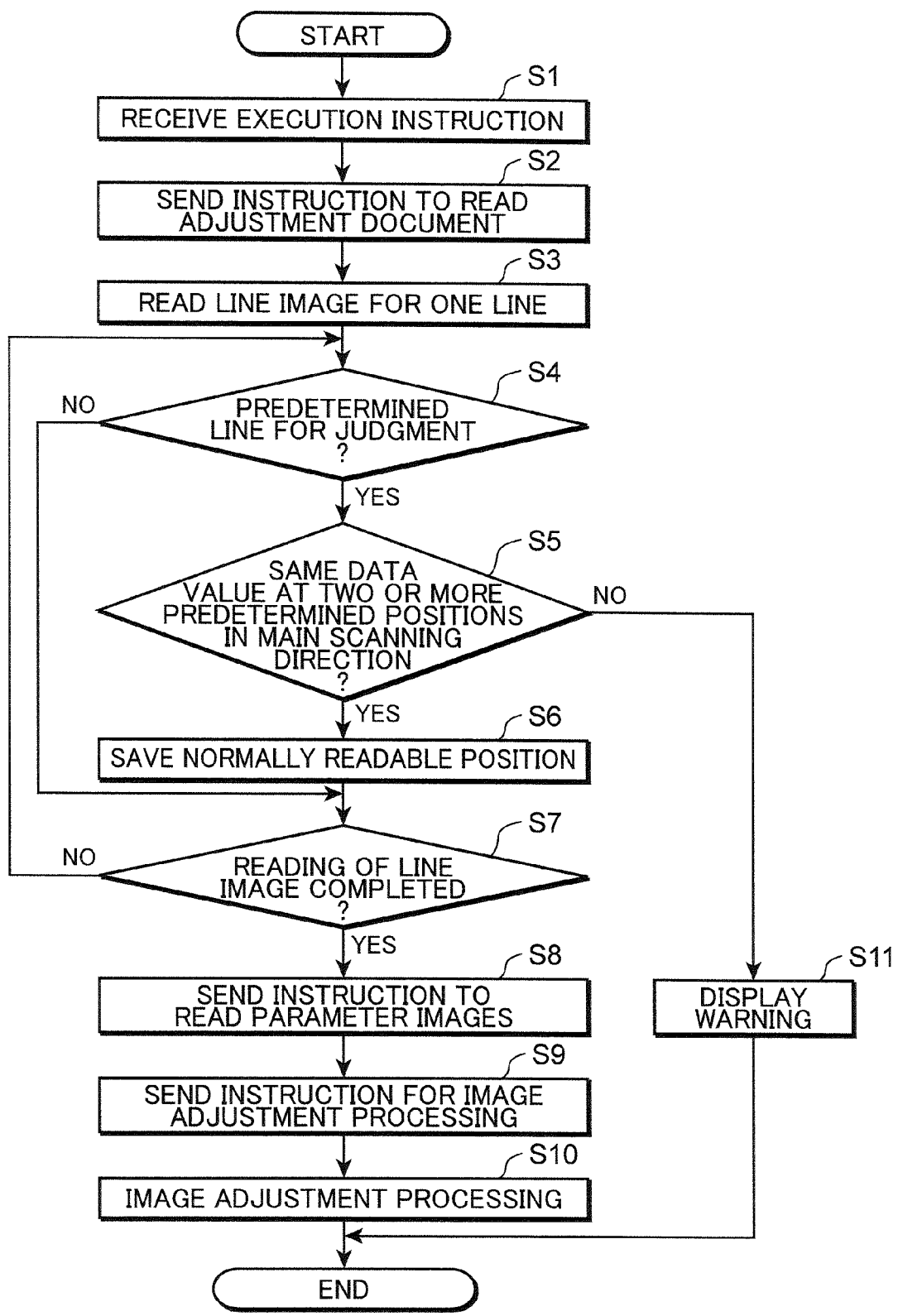
FIG. 4 is a flow chart showing an example of operations when an image adjustment processing is performed in the first embodiment.

Operations when the image adjustment processing is performed in the first embodiment are described below. As shown in FIG. 4, when an instruction to perform the image adjustment processing is received by the instruction receiver 14 (S1), the execution controller 16 sends an instruction to the image reader 22 to perform the image reading processing of reading the adjustment document (S2).

The image reader 22 successively reads the adjustment document placed on the contact glass 221 line by line in the main scanning direction in accordance with the instruction from the execution controller 16 and stores data obtained by reading in the RAM (S3).

Subsequently, the execution controller 16 judges whether or not at least two or more data corresponding to the plurality of predetermined positions in the main scanning direction coincide out of the data generated by reading the predetermined line for judgment in Step S3 (S5) when the line read in Step S3 is the predetermined line for judgment (S4; YES).

Note that the predetermined lines for judgment are stored in the flash memory beforehand corresponding to the identification information of the adjustment document. However, the predetermined lines for judgment are not limited to these, and fixed values may be stored in the flash memory beforehand so that the predetermined lines for judgment are provided at the same positions common to different adjustment documents.

That is, the execution controller 16 performs Steps S4 and S5 by reading the predetermined lines for judgment and the plurality of predetermined positions in the main scanning direction from the flash memory.

Referring back to FIG. 4, the execution controller 16 selects any one of the positions in the main scanning direction of the data judged to coincide and temporarily stores (saves) it as a position in the main scanning direction where there is no smear or scratch and normal reading is possible (normally readable position) in the RAM (S6) when judging that two or more data corresponding to the plurality of predetermined positions in the main scanning direction coincide out of the image data generated by reading the predetermined line for judgment in Step S3 (S5; YES).

The execution controller 16 repeats the processings in Step S3 and the following Steps until reading of all the line images provided on the adjustment document is completed by the image reader 22 (S7).

For example, in the case of performing the image adjustment processing using the adjustment document shown in FIG. 3, the execution controller 16 judges whether or not two or more data corresponding to the plurality of predetermined positions L1 to L4 in the main scanning direction coincide out of image data generated by reading the 6th line in Step S3 (S5) when the line read in Step S3 is the 6th line which is the predetermined line for judgment (S4; YES). When judging that the data corresponding to the positions L1, L3 in the main scanning direction coincide (S5; YES), the execution controller 16 selects either one of the positions L1, L3 in the main scanning direction of the data judged to coincide and saves it as the normally readable position in the RAM (S6).

Note that two lines for judgment used in Step S4 may be determined beforehand and it may be judged in Step S5 whether or not difference values between image data generated by reading the two lines for judgment corresponding to the plurality of predetermined positions in the main scanning direction coincide.

Referring back to FIG. 4, when judging, on the other hand, that none of the data corresponding to the plurality of predetermined positions in the main scanning direction coincide out of the image data generated by reading the predetermined lines for judgment in Step S3 (S5; NO), there are thought to be smears and/or scratches at the plurality of positions of the adjustment document in the main scanning direction. Thus, the execution controller 16 causes the display unit 51 to display, for example, a warning or the like urging the execution of the image adjustment processing using another adjustment document (S11) and sends an instruction to end the image adjustment processing to the image adjuster 12.

Subsequently, when reading of all the line images provided on the adjustment document is completed (S7; YES), the execution controller 16 sends an instruction to the image reader 22 to read a parameter image provided at the position in the main scanning direction indicated by the normally readable position saved in the RAM in Step S6 (S8) and then sends an instruction to the image adjuster 12 to perform the image adjustment processing using data corresponding to the position in the main scanning direction indicated by the normally readable position out of the image data generated by reading all the line images provided on the adjustment document by the image reader 22 and stored in the RAM and the parameter indicated by image data generated by reading the parameter image provided at the position in the main scanning direction indicated by the normally readable position in accordance with the instruction given in Step S8 (S9). Then, the image adjuster 12 performs the image adjustment processing in accordance with this instruction from the execution controller 16 (S10).

A specific example of performing the image adjustment processing using the adjustment document shown in FIG. 3 is described below. When reading of all the line images provided on the adjustment document is completed (S7; YES), the execution controller 16 sends an instruction to the image reader 22 to read the two-dimensional bar-code D1 (or D3) provided at the position in the main scanning direction indicated by the normally readable position L1 (or L3) saved in the RAM in Step S6 (S8) and then sends an instruction to the image adjuster 12 to perform the image adjustment processing using data in an area R1 (or R3) corresponding to the position in the main scanning direction indicated by the normally readable position L1 (or L3) out of the image data generated by reading all the line images provided on the adjustment document and stored in the RAM and data (parameter) in the area R1 (or R3) corresponding to the position in the main scanning direction indicated by the normally readable position L1 (or L3) indicated by image data generated by reading the two-dimensional bar-code D1 (or D3) and read beforehand by a density meter or the like (S9).

Then, in accordance with the instruction from the execution controller 16, the image adjuster 12 compares the data in the area R1 (or R3) corresponding to the position in the main scanning direction indicated by the normally readable position L1 (or L3) out of the image data generated by reading all the line images provided on the adjustment document and stored in the RAM and the data (parameter) in the area R1 (or R3) corresponding to the position in the main scanning direction indicated by the normally readable position L1 (or L3) indicated by the image data generated by reading the two-dimensional bar-code D1 (or D3) and read beforehand by the density meter or the like, and calculates a correction value used in correcting the image data read and generated by the image reader 22 in the image processor 23 based on deviation amounts of these data (S10).

For example, linear smears and/or scratches in the sub scanning direction may be produced on an adjustment document because the image adjustment processing has been frequently performed and the adjustment document has been frequently read. Due to this, it may not be possible to appropriately read partial areas of the line images on the adjustment document in the main scanning direction (e.g. areas R2, R4 in the above specific example).

However, even in such a case, according to this first embodiment, the image adjustment processing is performed using the data that coincide with each other (i.e. other coinciding data exist) and can be judged to be appropriately read out of the respective data (e.g. data in the areas R1 to R4 in the above specific example) generated by reading the line images and corresponding to the plurality of predetermined positions in the main scanning direction, e.g. the data in the area R1 in the above specific example (in this case, the data in the area R3 correspond to the other data), and the parameter indicated by the image data generated by reading the parameter image (e.g. two-dimensional bar-code D1 in the above specific example) provided at the position corresponding to the position in the main scanning direction of this data.

That is, the target position in the main scanning direction where the line images are read and the target position in the main scanning direction where the parameter image is read to perform the image adjustment processing are restricted to the position where appropriate reading is possible without producing any smear, scratch or the like, whereby the image adjustment processing can be appropriately performed.

Further, according to this first embodiment, an image indicated by image data generated by reading a document, an image of which is to be formed, by the image reader 22 and having the image adjustment processing appropriately performed thereon can be formed on a sheet by the recording unit 40.

(Second Embodiment)

Next, a second embodiment of the present invention is described. A complex machine of the second embodiment is constructed similarly to the first embodiment shown in FIGS. 1 and 2, but some of the functions shown in FIG. 2 differ from the first embodiment. The following description of the second embodiment is centered on points of difference from the first embodiment.

Similar to the first embodiment, an image adjuster 12 performs an image adjustment processing using image data generated by reading an adjustment document, which is a document for image adjustment, by an image reading processing. The image adjuster 12 performs the image adjustment processing including an input γ adjustment for adjusting image density to reproduce specified image density and an MTF (Modulation Transfer Function)/matrix adjustment for adjusting densities of respective YMCK colors to reproduce specified colors, for example, regularly such as after a specified number of documents are read or after the elapse of a specified time or when significant abnormality is found in image data to be output since image data read and generated by an image reader 22 does not necessarily indicate an original image on the document due to a reading characteristic of the image reader 22.

Figure 5:
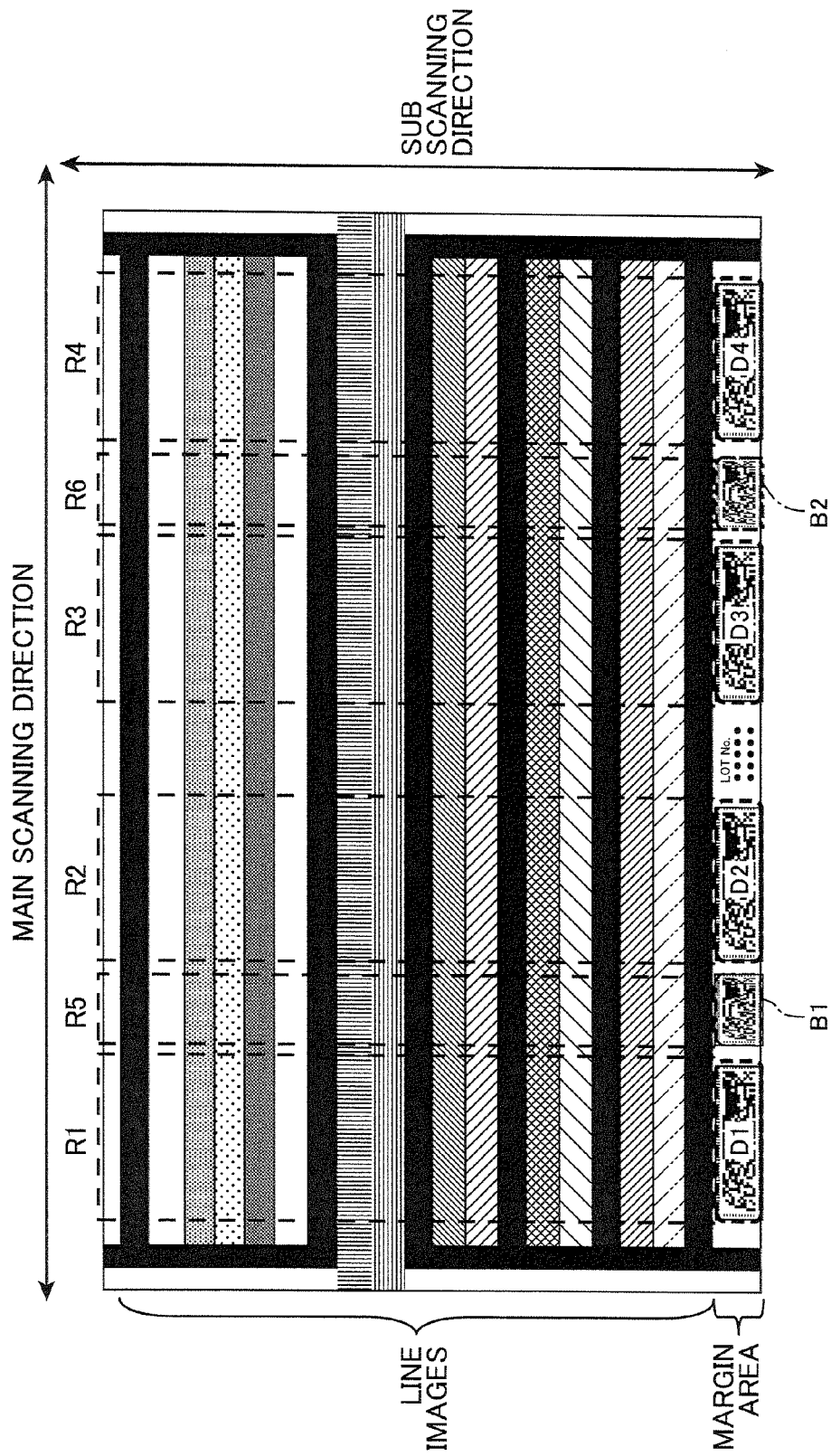
FIG. 5 is a diagram showing an example of an adjustment document used in a second embodiment of an image forming apparatus according to the invention.

For example, as shown in FIG. 5, line images each indicating the same chromaticness in a main scanning direction are arranged in parallel in a sub scanning direction on an adjustment document for image adjustment according to the second embodiment, and two-dimensional bar-codes D1 to D4 as parameter images according to the present invention are provided at a plurality of predetermined positions spaced apart in the main scanning direction in a margin area where no line images are provided.

Here, the two-dimensional bar-codes D1 to D4 are configured to indicate data corresponding to, for example, positions R1 to R4 in the main scanning direction where the respective two-dimensional bar-codes are provided out of image data generated by reading all the line images beforehand by a density meter or the like.

As an example of the image adjustment processing using the adjustment document shown in FIG. 5, the image adjuster 12 compares data corresponding to the positions R1 to R4 in the main scanning direction out of the image data generated by reading the line images of this adjustment document by the image reader 22 and data corresponding to the positions R1 to R4 in the main scanning direction indicated by image data generated by reading the two-dimensional bar-codes D1 to D4 by the image reader 22, and calculates a correction value used in correcting the image data read and generated by the image reader 22 in an image processor 23 based on deviation amounts of these data.

That is, the data corresponding to the positions R1 to R4 in the main scanning direction indicated by the two-dimensional bar-codes D1 to D4 are used as data indicating target values (parameters) in the case of performing the image adjustment processing using the adjustment document.

Here, parameter images according to the present invention are not limited to the above two-dimensional bar-codes. How they are expressed on the adjustment document may be arbitrarily changed, for example, by being provided as one-dimensional bar-codes on the adjustment document or by providing the respective data as character strings on the adjustment document. It goes without saying that a mechanism corresponding to an expression mode of the parameter images is provided to obtain the parameters, which are data indicated by the parameter images, from image data of the parameter images read by the image reader 22.

Further, on the adjustment document, two-dimensional bar-codes B1, B2 as sub-parameter images according to the present invention are provided at predetermined positions in a part of the margin area where the two-dimensional bar-codes D1 to D4 are not provided and a further two-dimensional bar-code similar to the two-dimensional bar-codes D1 to D4 and indicating a parameter corresponding to an area in the main scanning direction different from the pre-existing two-dimensional bar-codes D1 to D4 cannot be provided.

Here, the two-dimensional bar-codes B1, B2 are image data generated by reading at least a predetermined portion of the lines (e.g. 80% of the lines out of all the lines) out of all the line images provided on the adjustment document by the density meter or the like, and configured to indicate data corresponding to positions R5, R6 in the main scanning direction where the respective two-dimensional bar-codes B1, B2 are provided.

Note that the configuration of the adjustment document is not limited to the one shown in FIG. 5. For example, the two-dimensional bar-codes D1 to D4 and B1, B2 may be provided at different positions in the sub scanning direction and no line images may be formed at the positions in the sub scanning direction where the two-dimensional bar-codes D1 to D4 and B1, B2 are provided.

As an example of the image adjustment processing using the two-dimensional bar-codes B1, B2, the image adjuster 12 compares data of predetermined lines corresponding to the positions R5, R6 in the main scanning direction out of the image data generated by reading the adjustment document by the image reader 22 and data of the predetermined lines corresponding to the positions R5, R6 in the main scanning direction indicated by image data generated by reading the two-dimensional bar-codes B1, B2 by the image reader 22, and calculates a correction value used in correcting only chromaticness indicated by each predetermined line out of the image data read and generated by the image reader 22 in the image processor 23 based on deviation amounts of the data of the predetermined lines.

That is, the image data generated by reading the two-dimensional bar-codes B1, B2 indicate at least some of target values (sub-parameters) of elements indicated by the parameters indicated by the image data generated by reading the two-dimensional bar-codes D1 to D4, the target values for performing at least a part of the image adjustment processing using the parameters.

Note that, similar to the parameter images according to the present invention, the sub-parameter images according to the present invention are not limited to the above two-dimensional bar-codes. How they are expressed on the adjustment document may be arbitrarily changed, for example, by being provided as one-dimensional bar-codes on the adjustment document or by providing the respective data as character strings on the adjustment document. It goes without saying that a mechanism corresponding to an expression mode of the sub-parameter images is provided to obtain the sub-parameters, which are data indicated by the sub-parameter images, from the image data of the sub-parameter images read by the image reader 22.

As described above, even when an area for providing a further two-dimensional bar-code similar to the two-dimensional bar-codes D1 to D4 and indicating a parameter corresponding to an area in the main scanning direction different from the pre-existing two-dimensional bar-codes D1 to D4 does not exist in parts of the margin area on the adjustment document where neither the line images nor the two-dimensional bar-codes D1 to D4 are provided, the two-dimensional bar-codes B1, B2 are provided in a size sufficient to indicate the sub-parameters in the same expression mode as the two-dimensional bar-codes D1 to D4 in these parts of the margin area.

Information indicating a plurality of positions where the two-dimensional bar-codes D1 to D4, B1 and B2 are provided is stored in the flash memory beforehand. Similarly, information indicating the above predetermined lines, i.e. at least some of all the lines, for which the image data are generated by reading the two-dimensional bar-codes D1 to D4, indicated by the image data generated by reading the two-dimensional bar-codes B1, B2 is also stored in the flash memory beforehand.

An instruction receiver 14 receives an instruction to perform the image adjustment processing by the image adjuster 12. For example, the instruction receiver 14 receives the input of an execution condition of the image adjustment processing such as document identification information ID and the like of an adjustment document used in the image adjustment processing such as when a user depresses a function switch key provided in an operation key unit 52.

When the instruction to perform the image adjustment processing is received by the instruction receiver 14, an execution controller 16 sends an instruction to the image reader 22 to perform an image reading processing of reading the adjustment document and generating image data and then sends an instruction to the image adjuster 12 to perform an image adjustment processing using the image data read and generated by the image reading processing.

As described above, an example of the image reading apparatus 20 according to the present invention includes the image reader 22 and a control unit 10.

Figure 6:
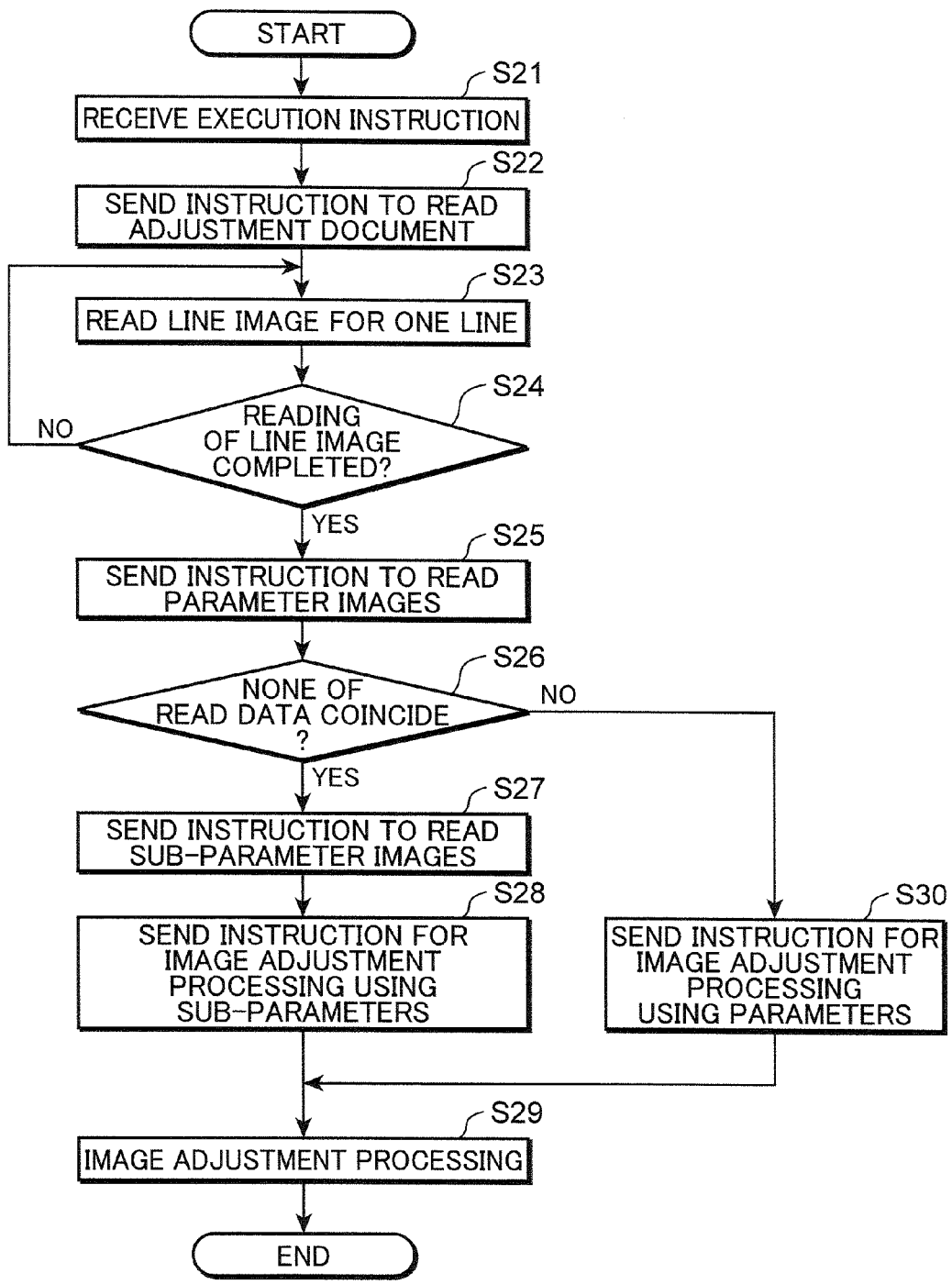
FIG. 6 is a flow chart showing an example of operations when an image adjustment processing is performed in the second embodiment.

Operations when the image adjustment processing is performed in the second embodiment are described below. As shown in FIG. 6, when an instruction to perform the image adjustment processing is received by the instruction receiver 14 (S21), the execution controller 16 sends an instruction to the image reader 22 to perform the image reading processing of reading the adjustment document and generating image data (S22).

The image reader 22 successively reads the adjustment document placed on a contact glass 221 line by line in the main scanning direction in accordance with the instruction from the execution controller 16 and repeats a processing of storing the read and generated image data in a RAM (S23) until reading of all the line images provided on the adjustment document is completed by the image reader 22 (S24).

Subsequently, when reading of all the line images provided on the adjustment document is completed (S24; YES), the execution controller 16 sends an instruction to the image reader 22 to read the parameter images provided at the plurality of predetermined positions read from the flash memory (S25).

Then, when judging that none of the data coincide because none of the image data respectively generated by reading the parameter images coincide with each other (S26; YES), the execution controller 16 sends an instruction to the image reader 22 to read the sub-parameter images provided at the plurality of predetermined positions read from the flash memory (S27) and sends an instruction to the image adjuster 12 to process at least a part of the image adjustment processing using the parameters indicated by the image data generated by reading the parameter images, using the sub-parameters indicated by image data generated by reading the sub-parameter images (S28). Then, the image adjuster 12 performs the image adjustment processing in accordance with this instruction from the execution controller 16 (S29).

Note that, in Steps S28, S29, there is no limitation as to which of the sub-parameters is used out of the sub-parameters indicated by the image data generated by reading the sub-parameter images provided at the plurality of positions. For example, all the sub-parameters may be used or only any one of the sub-parameters coinciding with each other may be used.

For example, in the case of performing the image adjustment processing using the adjustment document shown in FIG. 5, the execution controller 16 sends an instruction to the image reader 22 to read the two-dimensional bar-codes B1, B2 (S27) when judging that none of the image data generated by reading the two-dimensional bar-codes D1 to D4 coincide (S26; YES), and then sends an instruction to the image adjuster 12 to calculate a correction value in correcting only chromaticness indicated by each predetermined line in the image processor 23, i.e. to process at least a part of the image adjustment processing using the parameters indicated by the image data generated by reading the two-dimensional bar-codes D1 to D4, using the sub-parameters indicated by image data generated by reading the two-dimensional bar-codes B1, B2 (S28).

Then, in accordance with this instruction from the execution controller 16, after reading the predetermined lines from the flash memory, the image adjuster 12 compares data of the predetermined lines corresponding to the positions R5, R6 in the main scanning direction out of the data stored in the RAM in Step S23 and data of the predetermined lines corresponding to the positions R5, R6 in the main scanning direction indicated by the image data generated by reading the two-dimensional bar-codes B1, B2, and calculates a correction value used in correcting only chromaticness indicated by each predetermined line out of the image data read and generated by the image reader 22 in the image processor 23 based on deviation amounts of the data of the predetermined lines (S29).

On the other hand, when judging in Step S26 that the coinciding data exist (S26; NO) because at least two or more data out of the image data respectively generated by reading the parameter images coincide with each other, the execution controller 16 sends an instruction to the image adjuster 12 to perform the image adjustment processing using the parameter indicated by any one of the data judged to coincide (S30). Then, the image adjuster 12 performs the image adjustment processing in accordance with this instruction from the execution controller 16 (S29).

For example, in the case of performing the image adjustment processing using the adjustment document shown in FIG. 5, the execution controller 16 sends an instruction to the image adjuster 12 to perform the image adjustment processing using the parameter indicated by the image data generated by reading the two-dimensional bar-code D1 out of the image data judged to coincide, e.g. the image data generated by reading the two-dimensional bar-codes D1, D3 (S30) when judging that some of the image data generated by reading the two-dimensional bar-codes D1 to D4 coincide (S26; NO).

Then, in accordance with this instruction from the execution controller 16, the image adjuster 12 compares the data of all the lines corresponding to the position R1 in the main scanning direction out of the data stored in the RAM in Step S23 and the data of all the lines corresponding to the position R1 in the main scanning direction indicated by the image data generated by reading the two-dimensional bar-code D1, and calculates a correction value used in correcting the image data read and generated by the image reader 22 in the image processor 23 based on deviation amounts of these data (S29).

As described above, according to this second embodiment, even when an area for providing a further parameter image different from the pre-existing parameter images does not exist in the margin area where the line images of the adjustment document are not provided, the sub-parameter images indicating the sub-parameters are provided in a size sufficient to indicate the sub-parameters in the same expression mode as the parameter images at the predetermined positions in the parts of the margin area where the parameter images are not provided. Accordingly, even if it is not possible to appropriately read all the parameter images provided at the plurality of predetermined positions respectively spaced apart in the main scanning direction in the margin area where the line images of the adjustment document are not provided, at least a part of the image adjustment processing using the parameters indicated by the parameter images can be performed using the sub-parameters indicated by the image data generated by reading the sub-parameter images.

Further, an image indicated by image data generated by reading a document, an image of which is to be formed, by the image reader 22 and having the image adjustment processing appropriately performed thereon can be formed on a sheet by a recording unit 40.

As a modification of the second embodiment, the control unit 10 may function as a parameter storage 18 (encircled by dotted line in FIG. 2) for storing the parameter. Note that the parameter indicated by any one of the data judged to coincide by the execution controller 16 in the above Step S26 (FIG. 6) or a parameter received via a communication unit 30 from an external apparatus 2 is, for example, stored in the parameter storage 18.

In accordance with this, when judging that none of the image data respectively generated by reading the parameter images coincides, the execution controller 16 may judge whether or not the image data generated by reading the sub-parameter images coincide with at least some of elements indicated by the parameter stored in the parameter storage 18 and send an instruction to the image adjuster 12 to perform the image adjustment processing using the parameter stored in the parameter storage 18 when judging that they coincide.

Figure 7:
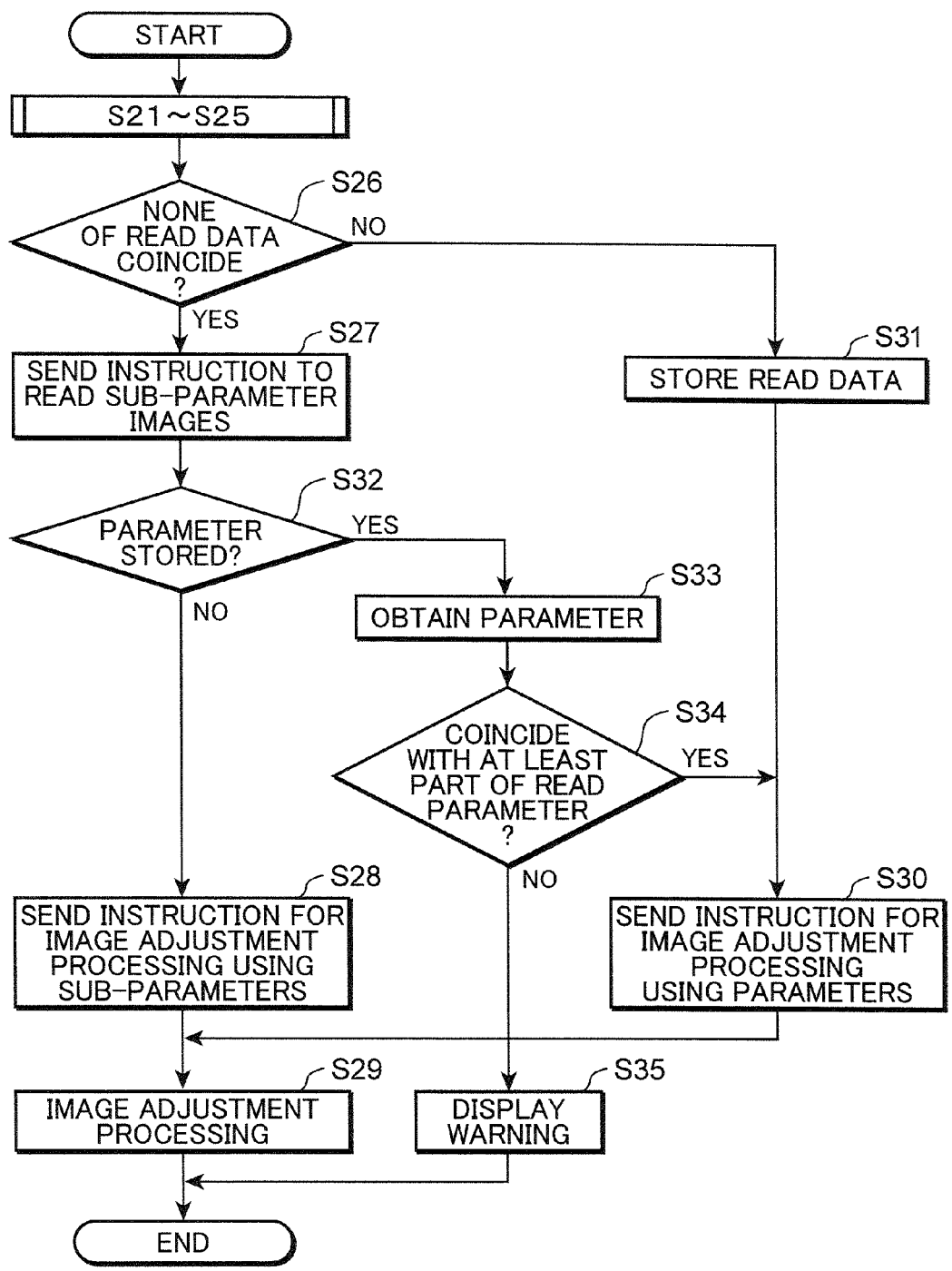
FIG. 7 is a flow chart showing another example of operations when the image adjustment processing is performed in the second embodiment.

Operations when the image adjustment processing is performed in the modified construction of the second embodiment are described with reference to FIG. 7. Note that the same processings as in Steps shown in FIG. 6 are performed in Steps in FIG. 7 denoted by the same reference numerals as in FIG. 6 unless particularly described, and are not described.

Following Step S25, when judging in Step S26 that the coinciding data exist (S26; NO) because at least two or more data out of the image data respectively generated by reading the parameter images in Step S25 coincide with each other, the execution controller 16 stores the parameter indicated by any one of the image data generated by reading the parameter images and judged to coincide in the parameter storage 18 (S31).

For example, in the case of performing the image adjustment processing using the adjustment document shown in FIG. 5, the execution controller 16 stores the parameter indicated by any one of the image data generated by reading the two-dimensional bar-codes D1 to D4 and judged to coincide out of the image data respectively generated by reading the two-dimensional bar-codes D1 to D4 in Step S25 in the parameter storage 18.

On the other hand, the execution controller 16 sends an instruction to the image reader 22 to read the sub-parameter images (S27) after judging that none of the data coincides because none of the image data respectively generated by reading the parameter images coincide with each other (S26; YES), and then judges whether or not any parameter is stored in the parameter storage 18 (S32).

When judging that the parameter is stored in the parameter storage 18 (S32; YES), the execution controller 16 reads and obtains the parameter from the parameter storage 18 (S33).

Subsequently, the execution controller 16 sends an instruction to the image adjuster 12 to perform the image adjustment processing using the parameter obtained in Step S33 (S30) when judging that the image data generated by reading the sub-parameter image in Step S27 coincide with at least some of elements indicated by the parameter obtained in Step S33 (S34; YES).

An example used in the description of the above Step S31 referring to FIG. 5 is specifically described. The execution controller 16 sends an instruction to the image adjuster 12 to perform the image adjustment processing using the parameter obtained in Step S33 (S30) when reading the predetermined lines from the flash memory and judging that the data of the predetermined lines generated by reading either one of the two-dimensional bar-codes B1, B2 in Step S27 coincide with the parameter obtained in Step S33, i.e. the data of the predetermined lines out of the data of all the lines generated by reading any one of the two-dimensional bar-codes D1 to D4 judged to coincide in Step S26 (S34; YES).

Note that, in Step S34, there is no limitation as to which of the sub-parameters is used out of the sub-parameters indicated by the image data generated by reading the sub-parameter images provided at the plurality of positions. For example, Step S30 may be performed only when all the sub-parameters coincide with at least some of the elements indicated by the parameter obtained in Step S33 or only when any one of the sub-parameters coinciding with each other coincides with at least some of the elements indicated by the parameter obtained in Step S33.

On the other hand, when judging that the image data generated by reading the sub-parameter images in Step S27 do not coincide with at least some of the elements indicated by the parameter obtained in Sep S33 (S34; NO), the execution controller 16, for example, causes a display unit 51 to display a warning or the like urging the execution of the image adjustment processing using another adjustment document (S35), judging that the parameter images and the sub-parameter images of the adjustment document could not be appropriately read, and sends an instruction to end the image adjustment processing to the image adjuster 12.

Note that, when judging in Step S32 that no parameter is stored in the parameter storage 18 (S32; NO), the execution controller 16 sends an instruction to the image adjuster 12 to perform a part of the image adjustment processing using the sub-parameters indicated by the image data generated by reading the sub-parameter images in Step S27 in the same manner as described above (S28).

As described above, according to the modified construction of this second embodiment, even if it is not possible to appropriately read all the parameter images, the image adjustment processing can be performed using the parameter stored in the parameter storage 18 without being limited to at least a part thereof when the sub-parameters indicated by the image data generated by reading the sub-parameter images coincide with at least some of the elements indicated by the parameter stored in the parameter storage 18.

Alternatively, the execution controller 16 may receive a parameter from the external apparatus 2 via the communication unit 30 instead of Steps S32 and S33 in the modified construction of the second embodiment or when it is judged in Step S32 that no parameter is stored in the parameter storage 18.

In this case, even if it is not possible to appropriately read all the parameter images, the image adjustment processing can be performed using the received parameter without being limited to at least a part thereof when the sub-parameters indicated by the image data generated by reading the sub-parameter images coincide with at least some of elements indicated by the parameter received from the external apparatus 2 via the communication unit 30.

(Third Embodiment)

Next, a third embodiment of the present invention is described. A complex machine of the third embodiment is constructed similarly to the first embodiment shown in FIGS. 1 and 2, but some of the functions shown in FIG. 2 differ from the first embodiment. The following description of the third embodiment is centered on points of difference from the first embodiment.

Similar to the first embodiment, an image adjuster 12 performs an image adjustment processing using image data generated by reading an adjustment document, which is a document for image adjustment, by an image reading processing. The image adjuster 12 performs the image adjustment processing including an input γ adjustment for adjusting image density to reproduce specified image density and an MTF (Modulation Transfer Function)/matrix adjustment for adjusting densities of respective YMCK colors to reproduce specified colors, for example, regularly such as after a specified number of documents are read or after the elapse of a specified time or when significant abnormality is found in image data to be output since image data read and generated by an image reader 22 does not necessarily indicate an original image on the document due to a reading characteristic of the image reader 22.

For example, as shown in FIG. 8, line images each indicating the same chromaticness in a main scanning direction are arranged in parallel in a sub scanning direction on an adjustment document for image adjustment according to the third embodiment, and two-dimensional bar-codes D1 to D4 as parameter images according to the present invention are provided at a plurality of predetermined positions spaced apart in the main scanning direction in a margin area where no line images are provided.

Here, the two-dimensional bar-codes D1 to D4 are configured to indicate data corresponding to, for example, positions R1 to R4 in the main scanning direction where the respective two-dimensional bar-codes are provided out of image data generated by reading all the line images beforehand by a density meter or the like.

As an example of the image adjustment processing using the adjustment document shown in FIG. 8, the image adjuster 12 compares data corresponding to the positions R1 to R4 in the main scanning direction out of the image data generated by reading the line images of this adjustment document by the image reader 22 and data corresponding to the positions R1 to R4 in the main scanning direction indicated by image data generated by reading the two-dimensional bar-codes D1 to D4 by the image reader 22, and calculates a correction value used in correcting the image data read and generated by the image reader 22 in an image processor 23 based on deviation amounts of these data.

That is, the data corresponding to the positions R1 to R4 in the main scanning direction indicated by the two-dimensional bar-codes D1 to D4 are used as data indicating target values (parameters) in the case of performing the image adjustment processing using the adjustment document.

Here, parameter images according to the present invention are not limited to the above two-dimensional bar-codes. How they are expressed on the adjustment document may be arbitrarily changed, for example, by being provided as one-dimensional bar-codes on the adjustment document or by providing the respective data as character strings on the adjustment document. It goes without saying that a mechanism corresponding to an expression mode of the parameter images is provided to obtain the parameters, which are data indicated by the parameter images, from image data of the parameter images read by the image reader 22.

Further, on the adjustment document, a two-dimensional bar-code B0 as a sub-parameter image according to the present invention is provided at a predetermined position in a part of the margin area where the two-dimensional bar-codes D1 to D4 are not provided and a further two-dimensional bar-code similar to the two-dimensional bar-codes D1 to D4 and indicating a parameter corresponding to an area in the main scanning direction different from the pre-existing two-dimensional bar-codes D1 to D4 cannot be provided.

Here, the two-dimensional bar-code B0 is image data generated by reading at least a predetermined portion of the lines (e.g. 80% of the lines out of all the lines) out of all the line images provided on the adjustment document by the density meter or the like, and configured to indicate data corresponding to a position R0 in the main scanning direction where the two-dimensional bar-code B0 is provided.

Note that the configuration of the adjustment document is not limited to the one shown in FIG. 8. For example, the two-dimensional bar-codes D1 to D4 and B0 may be provided at different positions in the sub scanning direction and no line images may be formed at the positions in the sub scanning direction where the two-dimensional bar-codes D1 to D4 and B0 are provided.

As an example of the image adjustment processing using the two-dimensional bar-code B0, the image adjuster 12 compares data of predetermined lines corresponding to the position R0 in the main scanning direction out of the image data generated by reading the adjustment document by the image reader 22 and data of the predetermined lines corresponding to the position R0 in the main scanning direction indicated by image data generated by reading the two-dimensional bar-code B0 by the image reader 22, and calculates a correction value used in correcting only chromaticness indicated by each predetermined line out of the image data read and generated by the image reader 22 in the image processor 23 based on deviation amounts of the data of the predetermined lines.

That is, the image data generated by reading the two-dimensional bar-code B0 indicate at least some of target values (sub-parameters) of elements indicated by the parameters indicated by the image data generated by reading the two-dimensional bar-codes D1 to D4, the target values for performing at least a part of the image adjustment processing using the parameters.

Note that, similar to the parameter images according to the present invention, the sub-parameter image according to the present invention is not limited to the above two-dimensional bar-code. How it is expressed on the adjustment document may be arbitrarily changed, for example, by being provided as a one-dimensional bar-code on the adjustment document or by providing the respective data as a character string on the adjustment document. It goes without saying that a mechanism corresponding to an expression mode of the sub-parameter image is provided to obtain the sub-parameter, which is data indicated by the sub-parameter image, from the image data of the sub-parameter image read by the image reader 22.

As described above, even when an area for providing a further two-dimensional bar-code similar to the two-dimensional bar-codes D1 to D4 and indicating a parameter corresponding to an area in the main scanning direction different from the pre-existing two-dimensional bar-codes D1 to D4 does not exist in parts of the margin area where neither the line images nor the two-dimensional bar-codes D1 to D4 are provided, the two-dimensional bar-code B0 is provided in a size sufficient to indicate the sub-parameter in the same expression mode as the two-dimensional bar-codes D1 to D4 in this part of the margin area.

Information indicating the positions where the two-dimensional bar-codes D1 to D4 and B0 are provided is stored in the flash memory beforehand. Similarly, information indicating the above predetermined lines, i.e. at least some of all the lines, for which the image data are generated by reading the two-dimensional bar-codes D1 to D4, indicated by the image data generated by reading the two-dimensional bar-code B0 is also stored in the flash memory beforehand.

An instruction receiver 14 receives an instruction to perform the image adjustment processing by the image adjuster 12 using an execution condition set and input by an operation unit 50. For example, the instruction receiver 14 receives an instruction to perform the image adjustment processing using an execution condition such as the one set and input by a user operating an operation key unit 52 or the like and corresponding to a parameter used in the image adjustment processing to be described later.

When the instruction to perform the image adjustment processing is received by the instruction receiver 14, an execution controller 16 sends an instruction to the image reader 22 to perform an image reading processing of reading the adjustment document and generating image data and then sends an instruction to the image adjuster 12 to perform an image adjustment processing using the image data read and generated by the image reading processing.

As described above, an example of the image reading apparatus 20 according to the present invention includes the image reader 22 and a control unit 10.

Operations when the image adjustment processing is performed in the third embodiment are described below. As shown in FIG. 9, when an instruction to perform the image adjustment processing is received by the instruction receiver 14 (S41), the execution controller 16 sends an instruction to the image reader 22 to perform the image reading processing of reading the adjustment document and generating image data (S42).

The image reader 22 successively reads the adjustment document placed on a contact glass 221 line by line in the main scanning direction in accordance with the instruction from the execution controller 16 and repeats a processing of storing the read and generated data in a RAM (S43) until reading of all the line images provided on the adjustment document is completed by the image reader 22 (S44).

Subsequently, when reading of all the line images provided on the adjustment document is completed (S44; YES), the execution controller 16 sends an instruction to the image reader 22 to read the parameter images provided at the plurality of predetermined positions read from the flash memory (S45).

Then, when judging that none of the data coincide because none of the image data respectively generated by reading the parameter images coincide with each other (S46; YES), the execution controller 16 sends an instruction to the image reader 22 to read the sub-parameter image provided at the predetermined position read from the flash memory (S47) and causes the sub-parameter indicated by image data generated by reading this sub-parameter image to be displayed on a setting screen displayed on the display unit 51 and used to set and input an execution condition of the image adjustment processing (S48).

For example, in the case of performing the image adjustment processing using the adjustment document shown in FIG. 8, the execution controller 16 sends an instruction to the image reader 22 to read the two-dimensional bar-code B0 (S47) when judging that none of the image data generated by reading the two-dimensional bar-codes D1 to D4 coincides (S46; YES).

Then, the execution controller 16 causes, as shown in FIG. 10A, data of predetermined lines ("255.0.0", "0.255.0", "0.0.255" in FIG. 10A) indicated by the image data generated by reading this two-dimensional bar-code B0 and corresponding to the position R0 in the main scanning direction out of the image data generated by reading all the line images provided on the adjustment document by the density meter or the like to be displayed as reference values in a reference value display area AL which is a left half area of the setting screen displayed on the display unit 51 and used to set and input the execution condition of the image adjustment processing (S48). Note that, in FIG. 10A, the lines for which "-" is written as the reference value are the lines not corresponding to the predetermined lines indicated by the two-dimensional bar-code B0 and "-" indicates that no reference value exists.

Referring back to FIG. 9, when the execution condition corresponding to the parameter used in the image adjustment processing is set and input by the operation unit 50 while the sub-parameter displayed on the setting screen is watched as the reference value and an instruction to perform the image adjustment processing using the execution condition corresponding to the set and input parameter is received by the instruction receiver 14 (S49; YES), the execution controller 16 sends an instruction to the image adjuster 12 to perform the image adjustment processing using the execution condition corresponding to the set and input parameter (S50). Then, the image adjuster 12 performs the image adjustment processing in accordance with this instruction from the execution controller 16 (S52).

This is described in detail, for example, using the above example referring to FIGS. 8 and 10A. When an instruction to perform the image adjustment processing is input by the operation unit 50 and received by the instruction receiver 14 (S49; YES) after the parameter used in the image adjustment processing (" . . . " in FIG. 10A) corresponding to the data corresponding to the position R0 in the main scanning direction out of the image data generated by reading all the line images provided on the adjustment document by the density meter or the like is set and input as the execution condition in an execution condition set/input area AR, which is a right half area of the setting screen, by the operation unit 50 while the above reference value in the reference value display area AL is watched, an instruction to perform the image adjustment processing using this set and input parameter (" . . . " in FIG. 10A) is sent to the image adjuster 12 (S50).

Then, in accordance with this instruction from the execution controller 16, the image adjuster 12 compares the data of all the lines corresponding to the position R0 in the main scanning direction out of the data stored in the RAM in Step S43 and the data (" . . . " in FIG. 10A) of all the lines corresponding to the position R0 in the main scanning direction indicated by the set and input parameter, and calculates a correction value used in correcting the image data read and generated by the image reader 22 in the image processor 23 based on deviation amounts of these data (S52).

On the other hand, when judging in Step S46 that the coinciding data exist (S46; NO) because at least two or more data out of the image data respectively generated by reading the parameter images coincide with each other, the execution controller 16 sends an instruction to the image adjuster 12 to perform the image adjustment processing using the parameter indicated by any one of the data judged to coincide (S51). Then, the image adjuster 12 performs the image adjustment processing in accordance with this instruction from the execution controller 16 (S52).

For example, in the case of performing the image adjustment processing using the adjustment document shown in FIG. 8, the execution controller 16 sends an instruction to the image adjuster 12 to perform the image adjustment processing using the parameter indicated by the image data generated by reading the two-dimensional bar-code D1 out of the image data judged to coincide, e.g. the image data generated by reading the two-dimensional bar-codes D1, D3 (S51) when judging that some of the image data generated by reading the two-dimensional bar-codes D1 to D4 coincide (S46; NO).

Then, in accordance with this instruction from the execution controller 16, the image adjuster 12 compares the data of all the lines corresponding to the position R1 in the main scanning direction out of the data stored in the RAM in Step S43 and the data of all the lines corresponding to the position R1 in the main scanning direction indicated by the image data generated by reading the two-dimensional bar-code D1, and calculates a correction value used in correcting the image data read and generated by the image reader 22 in the image processor 23 based on deviation amounts of these data (S52).

As described above, according to this third embodiment, even when an area for providing a further parameter image different from the pre-existing parameter images does not exist in the margin area where the line images of the adjustment document are not provided, the sub-parameter image indicating the sub-parameter is provided in a size sufficient to indicate the sub-parameter in the same expression mode as the parameter images at the predetermined position in the part of the margin area where the parameter images are not provided. Accordingly, even if it is not possible to appropriately read all the parameter images provided at the plurality of predetermined positions respectively spaced apart in the main scanning direction in the margin area where the line images of the adjustment document are not provided, the sub-parameter indicated by the image data generated by reading the sub-parameter image can be displayed within the setting screen used to set and input the execution condition of the image adjustment processing.

Thus, the execution condition corresponding to the parameter can be easily set and input while the sub-parameter coinciding with at least some of the elements indicated by the parameter displayed on the setting screen is watched.

Further, according to the construction of the third embodiment, an image indicated by image data generated by reading a document, an image of which is to be formed, by the image reader 22 and having the image adjustment processing appropriately performed thereon can be formed on a sheet by a recording unit 40.

Note that, as a modification of the third embodiment, in Step S48, the execution controller 16 may cause the sub-parameter indicated by the image data generated by reading the sub-parameter image to be displayed as the set and input execution condition on the setting screen displayed on the display unit 51 and used to set and input the execution condition of the image adjustment processing.

This is described in detail using the above example referring to FIGS. 8 and 10A. As shown in FIG. 10B, the execution controller 16 may, in Step S48, cause the data of the predetermined lines ("255.0.0", "0.255.0", "0.0.255" in FIG. 10B) indicated by the image data generated by reading the two-dimensional bar-code B0 and corresponding to the position R0 in the main scanning direction to be displayed as the set and input execution condition in the execution condition set/input area AR displayed on the display unit 51 and used to set and input the execution condition of the image adjustment processing.

According to this modified construction of the third embodiment, even if it is not possible to appropriately read all the parameter images, time and effort required to set and input the execution condition corresponding to the parameter on the setting screen can be reduced by displaying the sub-parameter as the set and input execution condition within the setting screen used to set and input the execution condition of the image adjustment processing.

Note that, in the above respective embodiments, the complex machine has been described as an example of the image forming apparatus according to the present invention. Without being limited to this, the image forming apparatus according to the present invention may be a printer, a copier, a scanner, a facsimile machine or another image forming apparatus provided with an image reading apparatus according to the present invention.

The first embodiment may further include a storage device 70 (encircled by dotted line in FIG. 2) such as an HDD storing data (adjustment data) used to form the line images and the parameter images. According to this construction, an adjustment document can be produced by forming line images and parameter images using expensive toners or the like capable of maintaining image quality for an extended period of time by the recording unit 40 using the adjustment data stored in the storage device 70 and read by the control unit 10.

Similarly, the second and third embodiments may also include a storage device 70 (encircled by dotted line in FIG. 2) such as an HDD storing data (adjustment data) used to form the line images, the parameter images and the sub-parameter images. According to this construction, an adjustment document can be produced by forming line images, parameter images and sub-parameter images using expensive toners or the like capable of maintaining image quality for an extended period of time by the recording unit 40 using the adjustment data stored in the storage device 70 and read by the control unit 10.

The present invention is not limited to the constructions of the above respective embodiments and various changes can be made. The constructions and processings shown in FIGS. 1 to 10A and 10B are merely illustration of the respective embodiments according to the present invention and not of the nature to limit the present invention to the respective embodiments.

This application is based on Japanese Patent application Nos. 2010-266806, 2010-266807 and 2010-266808 filed in Japan Patent Office on Nov. 30, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus, comprising:
an image reader that performs an image reading processing of reading a document and generating image data while moving relative to the document in a sub scanning direction;
an image adjuster that performs an image adjustment processing using image data generated by reading an adjustment document, which is a document for image adjustment, by the image reading processing performed by the image reader;
an instruction receiver that receives an instruction to perform the image adjustment processing; and
an execution controller that causes the image reader to perform the image reading processing of reading the adjustment document and generating the image data, and causes the image adjuster to perform the image adjustment processing using the image data generated by the image reading processing when the instruction to perform the image adjustment processing is received by the instruction receiver,
wherein the adjustment document includes line images each indicating the same chromaticness in a main scanning direction and arranged in parallel in the sub scanning direction and parameter images provided at a plurality of predetermined positions respectively spaced apart in the main scanning direction in a margin area where the line images are not provided,
wherein the parameter images indicate parameters used in a case of performing the image adjustment processing using image data corresponding to positions in the main scanning direction respectively indicated by the plurality of predetermined positions out of image data generated by reading the line images by the image reading processing, and
wherein the execution controller causes the image reader to perform the image reading processing of reading the adjustment document, judges whether or not the respective image data generated by reading the line images and corresponding to the plurality of predetermined positions in the main scanning direction coincide with each other, selects any one of the image data judged to coincide out of the respective image data, and causes the image adjuster to perform the image adjustment processing using the selected image data and the parameter indicated by the image data generated by reading the parameter image provided at the position in the main scanning direction of the selected image data.

2. An image forming apparatus, comprising:
the image reading apparatus according to claim 1; and
a recording unit that forms an image indicated by image data on a recording medium using the image data generated by reading a document, an image of which is to be formed, by the image reader.

3. The image forming apparatus according to claim 2, further comprising a storage that stores adjustment data used to form the line images and the parameter images on the recording medium,
  wherein the recording unit produces the adjustment document by forming the line images and the parameter images on the recording medium using the adjustment data read from the storage.

4. An adjustment document which is a document for image adjustment used in an image adjustment processing in an image reading apparatus, comprising:
  line images each indicating the same chromaticness in a main scanning direction and arranged in parallel in a sub scanning direction; and
  parameter images provided at a plurality of predetermined positions respectively spaced apart in the main scanning direction in a margin area where the line images are not provided,
  wherein the image reading apparatus includes:
    an image reader that performs an image reading processing of reading a document and generating image data while moving relative to the document in the sub scanning direction;
    an image adjuster that performs an image adjustment processing using image data generated by reading the adjustment document by the image reading processing performed by the image reader;
    an instruction receiver that receives an instruction to perform the image adjustment processing; and
    an execution controller that causes the image reader to perform the image reading processing of reading the adjustment document, and causes the image adjuster to perform the image adjustment processing using the image data generated by the image reading processing when the instruction to perform the image adjustment processing is received by the instruction receiver,
  wherein the parameter images indicate parameters used in a case of performing the image adjustment processing using image data corresponding to positions in the main scanning direction respectively indicated by the plurality of predetermined positions out of image data generated by reading the line images by the image reading processing, and
  wherein the execution controller causes the image reader to perform the image reading processing of reading the adjustment document, judges whether or not the respective image data generated by reading the line images and corresponding to the plurality of predetermined positions in the main scanning direction coincide with each other, selects any one of the image data judged to coincide out of the respective image data, and causes the image adjuster to perform the image adjustment processing using the selected image data and the parameter indicated by the image data generated by reading the parameter image provided at the position in the main scanning direction of the selected image data.

5. An image reading apparatus, comprising:
  an image reader that performs an image reading processing of reading a document and generating image data while moving relative to the document in a sub scanning direction;
  an image adjuster that performs an image adjustment processing using image data generated by reading an adjustment document, which is a document for image adjustment, by the image reading processing performed by the image reader;
  an instruction receiver that receives an instruction to perform the image adjustment processing; and
  an execution controller that causes the image reader to perform the image reading processing of reading the adjustment document and generating the image data, and causes the image adjuster to perform the image adjustment processing using the image data generated by the image reading processing when the instruction to perform the image adjustment processing is received by the instruction receiver,
  wherein the adjustment document includes line images each indicating the same chromaticness in a main scanning direction and arranged in parallel in the sub scanning direction, parameter images provided at a plurality of predetermined positions respectively spaced apart in the main scanning direction in a margin area where the line images are not provided, and a sub-parameter image provided at a predetermined position in a part of the margin area where the parameter images are not provided and which is not sufficient to provide the parameter image,
  wherein the parameter images indicate parameters used in a case of performing the image adjustment processing using image data generated by reading the line images by the image reading processing,
  wherein the sub-parameter image indicates a sub-parameter used to perform at least a part of the image adjustment processing using the parameters, and
  wherein the execution controller causes the image reader to perform the image reading processing of reading the adjustment document and generating the image data, judges whether or not all the image data generated by reading the parameter images coincide with each other, and causes, when judging that none of the image data coincide with each other, the image adjuster to perform at least a part of the image adjustment processing using the parameters, using the sub-parameter indicated by the image data generated by reading the sub-parameter image.

6. The image reading apparatus according to claim 5, further comprising a parameter storage that stores the parameter,
  wherein the execution controller judges whether or not the sub-parameter indicated by the image data generated by reading the sub-parameter image coincides with at least some of elements indicated by the parameter stored in the parameter storage when judging that none of the image data generated by reading the parameter images coincide with each other, and causes, when judging that the sub-parameter coincides, the image adjuster to perform the image adjustment processing using the parameter stored in the parameter storage.

7. The image reading apparatus according to claim 5, further comprising a communication unit that carries out communication of various data with an external apparatus,
  wherein the execution controller receives the parameter from the external apparatus via the communication unit when judging that none of the image data generated by reading the parameter images coincide with each other, judges whether or not the sub-parameter indicated by the image data generated by reading the sub-parameter image coincides with at least some of elements indicated by the received parameter, and causes, when judging that the sub-parameter coincides, the image adjuster to perform the image adjustment processing using the received parameter.

8. An image forming apparatus, comprising:
  the image reading apparatus according to claim 5; and a recording unit that forms an image indicated by image data on a recording medium using the image data generated by reading a document, an image of which is to be formed, by the image reader.

9. The image forming apparatus according to claim 8, further comprising a storage that stores adjustment data used to form the line images, the parameter images and the sub-parameter image on the recording medium, wherein the recording unit produces the adjustment document by forming the line images, the parameter images and the sub-parameter image on the recording medium using the adjustment data read from the storage.

10. An image reading apparatus, comprising:

an operation unit that includes a display unit on which a setting screen used to set and input execution conditions of various functional operations executable in the image reading apparatus is displayed, and is adapted to set and input the execution condition on the setting screen displayed on the display unit;

an image reader that performs an image reading processing of reading a document and generating image data while moving relative to the document in a sub scanning direction;

an image adjuster that performs an image adjustment processing using image data generated by reading an adjustment document, which is a document for image adjustment, by the image reading processing performed by the image reader;

an instruction receiver that receives an instruction to perform the image adjustment processing using the execution condition set and input by the operation unit; and an execution controller that causes the image reader to perform the image reading processing of reading the adjustment document and generating the image data, and causes the image adjuster to perform the image adjustment processing using the image data generated by the image reading processing and the execution condition of the image adjustment processing set and input by the operation unit when the instruction to perform the image adjustment processing is received by the instruction receiver, wherein the adjustment document includes line images each indicating the same chromaticness in a main scanning direction and arranged in parallel in the sub scanning direction, parameter images provided at a plurality of predetermined positions respectively spaced apart in the main scanning direction in a margin area where the line images are not provided, and a sub-parameter image provided at a predetermined position in a part of the margin area where the parameter images are not provided and which is not sufficient to provide the parameter image, wherein the parameter images indicate parameters used in a case of performing the image adjustment processing using image data generated by reading the line images by the image reading processing, wherein the sub-parameter image indicates a sub-parameter used to perform at least a part of the image adjustment processing using the parameters and coinciding with at least some of elements indicated by the parameters, wherein the execution controller causes the image reader to perform the image reading processing of reading the adjustment document and generating the image data, judges whether or not all the image data generated by reading the parameter images coincide with each other, and causes, when judging that none of the image data coincide with each other, the sub-parameter indicated by image data generated by reading the sub-parameter image to be displayed within the setting screen displayed on the display unit and used to set and input the execution condition of the image adjustment processing, and wherein the execution controller causes the image adjuster to perform the image adjustment processing using an execution condition corresponding to the set and input parameter when the execution condition of the image adjustment processing corresponding to the parameter is set and input on the displayed setting screen by the operation unit and an instruction to perform the image adjustment processing using the set and input execution condition is received by the instruction receiver.

11. The image reading apparatus according to claim 10, wherein the execution controller causes the sub-parameter indicated by the image data generated by reading the sub-parameter image to be displayed as the set and input execution condition within the setting screen displayed on the display unit and used to set and input the execution condition of the image adjustment processing when judging that none of the image data generated by reading the parameter images coincide with each other.

12. An image forming apparatus, comprising:
the image reading apparatus according to claim 10; and
a recording unit that forms an image indicated by image data on a recording medium using the image data generated by reading a document, an image of which is to be formed, by the image reader.

13. The image forming apparatus according to claim 12, further comprising a storage that stores adjustment data used to form the line images, the parameter images and the sub-parameter image on the recording medium, wherein the recording unit produces the adjustment document by forming the line images, the parameter images and the sub-parameter image on the recording medium using the adjustment data read from the storage.

\* \* \* \* \*